United States Patent
Rudrappa Goniwada et al.

(10) Patent No.: US 10,992,780 B1
(45) Date of Patent: Apr. 27, 2021

(54) MICROSERVICES AS A MICROSERVICE

(71) Applicant: Accenture Global Solutions Limited, Dublin (IE)

(72) Inventors: Shivakumar Rudrappa Goniwada, Bangalore (IN); Adnan Ahmad Khan, Gurgaon (IN); Karthikeyan Krishnamoorthy, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/732,848

(22) Filed: Jan. 2, 2020

(51) Int. Cl.
  *H04L 29/08* (2006.01)
  *G06N 20/00* (2019.01)
  *H04L 29/06* (2006.01)
  *G06F 9/54* (2006.01)

(52) U.S. Cl.
  CPC .............. *H04L 67/34* (2013.01); *G06F 9/542* (2013.01); *G06N 20/00* (2019.01); *H04L 63/0807* (2013.01); *H04L 67/2833* (2013.01)

(58) Field of Classification Search
  CPC . H04L 67/34; H04L 63/0807; H04L 67/2833; G06N 20/00; G06F 9/542
  See application file for complete search history.

(56) References Cited

U.S. PATENT DOCUMENTS

| | | | | |
|---|---|---|---|---|
| 2016/0124742 | A1* | 5/2016 | Rangasamy | G06F 9/5072 717/103 |
| 2018/0034840 | A1* | 2/2018 | Marquardt | G06F 16/9024 |
| 2018/0083967 | A1* | 3/2018 | Subramanian | G06F 8/65 |
| 2018/0314549 | A1* | 11/2018 | Chokkalingam | H04L 41/5051 |
| 2019/0182309 | A1* | 6/2019 | Koszek | H04L 69/329 |
| 2019/0317776 | A1* | 10/2019 | Walsh | H04L 67/34 |
| 2020/0293167 | A1* | 9/2020 | Blyumen | G06F 16/245 |
| 2020/0295984 | A1* | 9/2020 | Qian | H04L 41/0631 |
| 2020/0296172 | A1* | 9/2020 | Gunjal | H04L 45/42 |

OTHER PUBLICATIONS

Jarwar, et al., "Microservices in Web Objects Enabled IoT Environment for Enhancing Reusability", Sensors 2018, 18, 352, 21 pages. (Year: 2018).*

Pahl et al., "Machine Learning as a Reusable Microservice", Technical University of Munich, © 2018 IEEE, 7 pages. (Year: 2018).*

* cited by examiner

*Primary Examiner* — Arvin Eskandarnia
*Assistant Examiner* — Chhian (Amy) Ling
(74) *Attorney, Agent, or Firm* — Harrity & Harrity, LLP

(57) ABSTRACT

A microservice platform may receive a request to configure a microservice for use by a microservices as a service (MaaS) client platform and may determine, based on a microservice type of the microservice, one or more parameters for the microservice. The microservice platform may process the request using a natural language processing machine learning model to determine one or more values for the one or more parameters. The microservice platform may configure, using a microservice template, a reusable microservice to satisfy the request to configure the microservice. The reusable microservice may be hosted by the microservice platform and may be configured based on the microservice type, the one or more parameters, and the one or more values. The microservice platform may communicate, using the reusable microservice, with one or more backend services to perform various actions associated with one or more application-specific microservices of the MaaS client platform.

20 Claims, 16 Drawing Sheets

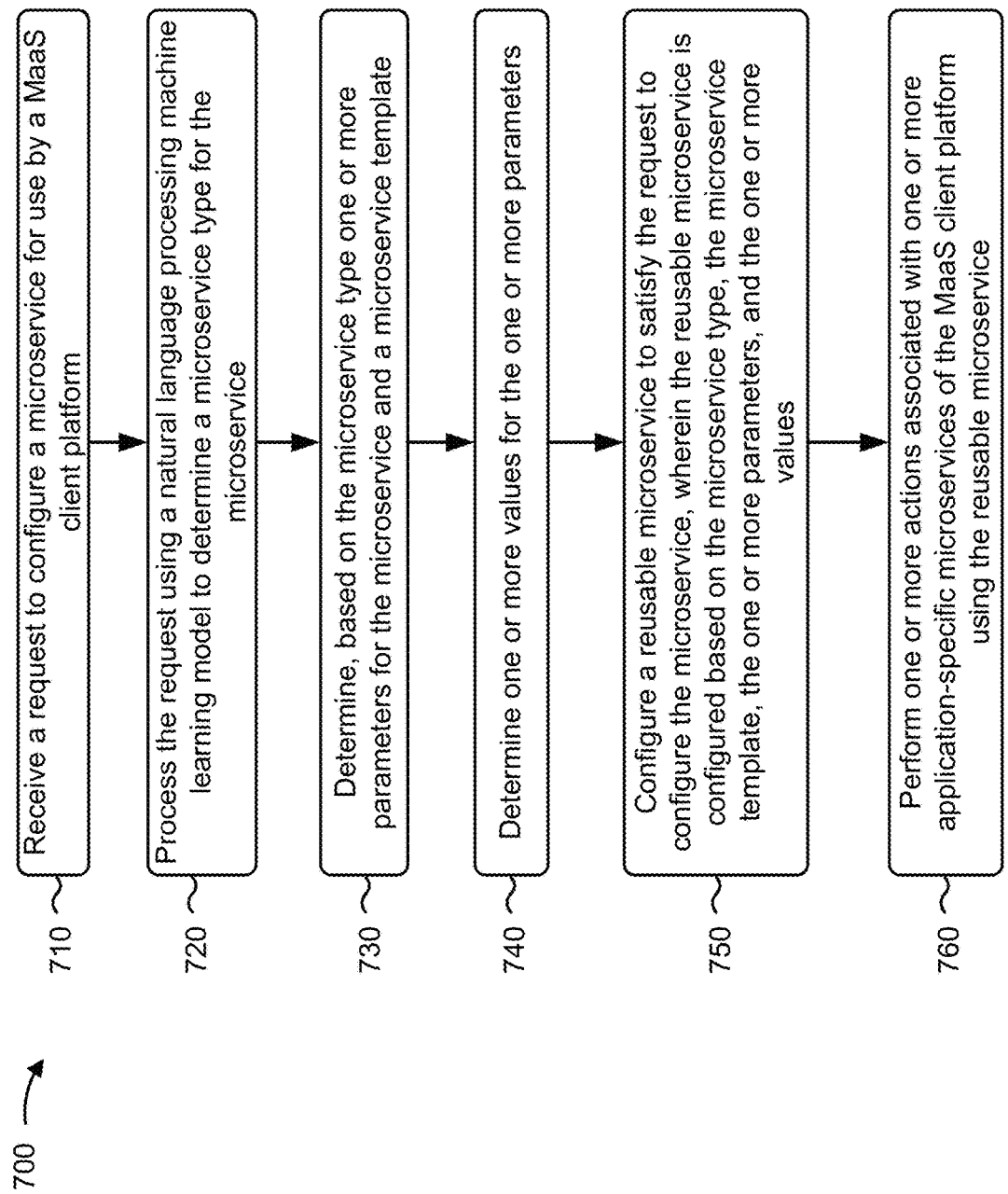

MICROSERVICES AS A MICROSERVICE

BACKGROUND

Microservices may be configured as a collection of loosely coupled services of a software application. Each microservice may be responsible for handling a discrete task and may communicate with other microservices to accomplish a larger complex goal of an overall software application.

SUMMARY

According to some implementations, a method may include receiving, by a microservice platform, a request to configure a microservice for use by a microservices as a service (MaaS) client platform; determining, by the microservice platform and based on a microservice type of the microservice, one or more parameters for the microservice; processing, by the microservice platform, the request using a natural language processing machine learning model to determine one or more values for the one or more parameters; configuring, by the microservice platform and using a microservice template, a reusable microservice to satisfy the request to configure the microservice, wherein the reusable microservice is hosted by the microservice platform, and wherein the reusable microservice is configured based on the microservice type, the one or more parameters, and the one or more values; and communicating, by the microservice platform and using the reusable microservice, with one or more backend services to perform one or more actions associated with one or more application-specific microservices of the MaaS client platform.

According to some implementations, a microservice platform may include one or more memories; and one or more processors, communicatively coupled to the one or more memories, configured to receive a request to add a microservice to a MaaS client platform; process the request using a natural language processing machine learning model to determine a microservice type for the microservice; determine, based on the microservice type: one or more parameters for the microservice, and a microservice template; process the request using the natural language processing machine learning model to determine one or more values for the one or more parameters; configure a reusable microservice to satisfy the request to configure the microservice, wherein the reusable microservice is hosted by the microservice platform, and wherein the reusable microservice is configured based on the microservice type, the microservice template, the one or more parameters, and the one or more values; and perform one or more actions associated with one or more application-specific microservices of the MaaS client platform using the reusable microservice.

According to some implementations, a non-transitory computer-readable medium may store one or more instructions. The one or more instructions, when executed by one or more processors of a microservice platform, may cause the one or more processors to receive a request to add a microservice to a MaaS client platform; process the request using a natural language processing machine learning model to determine a microservice type for the microservice; determine, based on the microservice type one or more parameters for the microservice, and a microservice template; determine one or more values for the one or more parameters; configure a reusable microservice to satisfy the request to configure the microservice, wherein the reusable microservice is configured based on the microservice type, the microservice template, the one or more parameters, and the one or more values; and perform one or more actions associated with one or more application-specific microservices of the MaaS client platform using the reusable microservice.

BRIEF DESCRIPTION OF THE DRAWINGS

FIGS. 5-7 are flowcharts of example processes for configuring a reusable microservice.

DETAILED DESCRIPTION

The following detailed description of example implementations refers to the accompanying drawings. The same reference numbers in different drawings may identify the same or similar elements.

Entities more and more are moving to developing software applications using microservices, transitioning monolithic software applications to cloud-based microservices architectures, and/or the like. While a microservices architecture permits portions of a software application to be independently deployed, scaled, and maintained, each microservice associated with the software application needs to be developed from scratch or from the ground up for use by a particular software application. An entity (e.g., a corporation, an educational institution, and/or the like) may develop hundreds or thousands of software applications, and each software application may contain hundreds of microservices. Thus, developing microservices from scratch or from the ground up for use by a particular software application requires a significant amount of time and computing resources.

Some implementations described herein provide a microservice platform that permits microservices to be implemented as a reusable service framework. The microservice platform permits microservices to be reusable in the development of many software applications, which permits the microservice platform to provide reusable microservices as a service (MaaS). The microservice platform is capable of using natural language processing and machine learning models to automatically configure a reusable microservices based on various types of input (e.g., text-based inputs, voice commands, structured and/or unstructured inputs, and/or the like). Each reusable microservice hosted by the microservice platform is capable of being used by a plurality of software applications and/or applications-specific microservices hosted by MaaS client platforms (e.g., clients of the MaaS provided by the microservice platform). In this way, the reusable microservices hosted by the microservice platform reduces the quantity of application-specific microservices that need to be developed for a particular software application, which reduces the amount of time and computing resources that are consumed in developing a software application relative to the development of application-specific microservices from scratch or from the ground up for use in the particular software application. Moreover, the reusable microservices hosted by the microservice platform reduces complexity of application-specific microservices that are used in software applications because common functionalities that are used across many application-specific microservices can be moved out of the development of the application-specific microservices and into a reusable microservices.

Figure 1A:
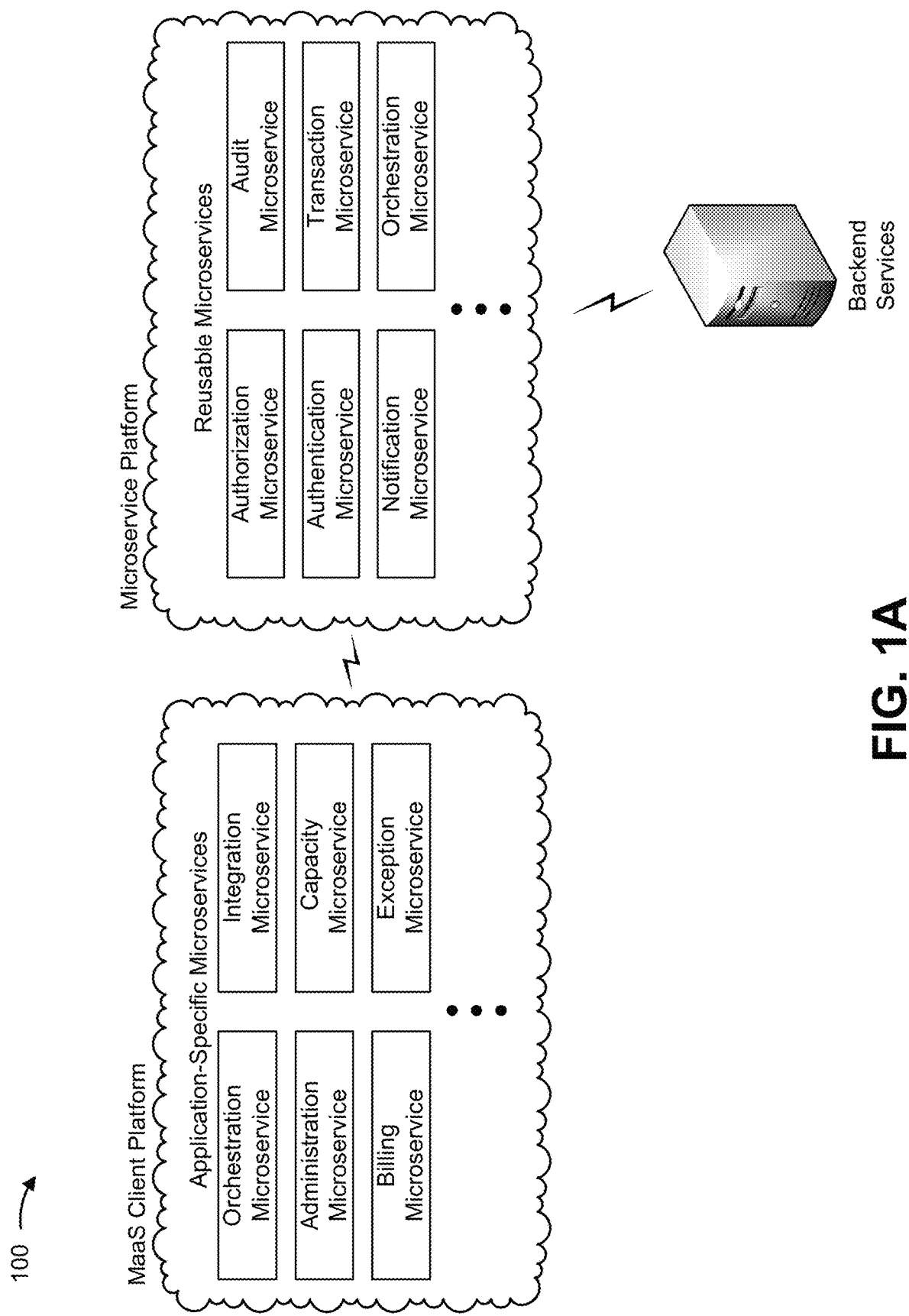
FIGS. 1A-1D and 2A-2G are diagrams of one or more example implementations described herein.

FIGS. 1A-1D are diagrams of one or more example implementations 100 described herein. As shown in FIG. 1A, example implementation(s) 100 may include a MaaS client platform, a microservice platform, and one or more backend services hosted on a backend services device.

The MaaS client platform may be associated with an entity (e.g., a corporation, an educational institution, a government department, and/or the like) and may be a platform that hosts a plurality of application-specific microservices. The application-specific microservices may be containerized microservices that are developed, configured, and/or otherwise tailored for use in a particular software application of the entity.

As shown in FIG. 1A, an example application-specific microservice may include an orchestration microservice for a particular software application (e.g., a microservice that provides orchestration services for a particular software application). As further shown in FIG. 1A, another example application-specific microservice may include an administration microservice for a particular software application (e.g., a microservice that provides software application administration services for a particular software application). As further shown in FIG. 1A, another example application-specific microservice may include a billing microservice for a particular software application (e.g., a microservice that provides billing services for a particular software application). As further shown in FIG. 1A, another example application-specific microservice may include an integration microservice for a particular software application (e.g., a microservice that provides integration services for a particular software application). As further shown in FIG. 1A, another example application-specific microservice may include a capacity microservice for a particular software application (e.g., a microservice that provides capacity management services for a particular software application). As further shown in FIG. 1A, another example application-specific microservice may include an exception microservice for a particular software application (e.g., a microservice that provides system exception management services for a particular software application). Other types of microservices may be developed and hosted as application-specific microservices by the MaaS client platform.

In some implementations, the MaaS client platform may be a MaaS client of the microservice platform. In this case, the microservice platform may host and provide access to reusable microservices as part of a MaaS. Reusable microservices may be containerized microservices that may be configured and used by a plurality of application-specific microservices without having to develop and/or build the reusable microservices from scratch or from the ground up.

As shown in FIG. 1A, an example reusable microservice may include an authorization microservice that provides authorization services for a plurality of application-specific microservices hosted by the MaaS client platform and/or other MaaS clients. As further shown in FIG. 1A, another example reusable microservice may include an authentication microservice that provides authentication services for a plurality of application-specific microservices hosted by the MaaS client platform and/or other MaaS clients. As further shown in FIG. 1A, another example reusable microservice may include a notification microservice that provides notification services for a plurality of application-specific microservices hosted by the MaaS client platform and/or other MaaS clients. As further shown in FIG. 1A, another example reusable microservice may include an audit microservice that provides audit services for a plurality of application-specific microservices hosted by the MaaS client platform and/or other MaaS clients. As further shown in FIG. 1A, another example reusable microservice may include a transaction microservice that provides transaction services for a plurality of application-specific microservices hosted by the MaaS client platform and/or other MaaS clients. As further shown in FIG. 1A, another example reusable microservice may include an orchestration microservice that provides orchestration services for a plurality of application-specific microservices hosted by the MaaS client platform and/or other MaaS clients. Other types of microservices may be developed and hosted as reusable microservices by the microservice platform.

In some implementations, the reusable microservices hosted by the microservice platform may perform actions for the application-specific microservices hosted by the MaaS client platform by communicating with the backend services. The backend services may include identity provider services, database services (e.g., authorization database services, audit database services, and/or the like), messaging services, and/or the like.

Figure 1B:
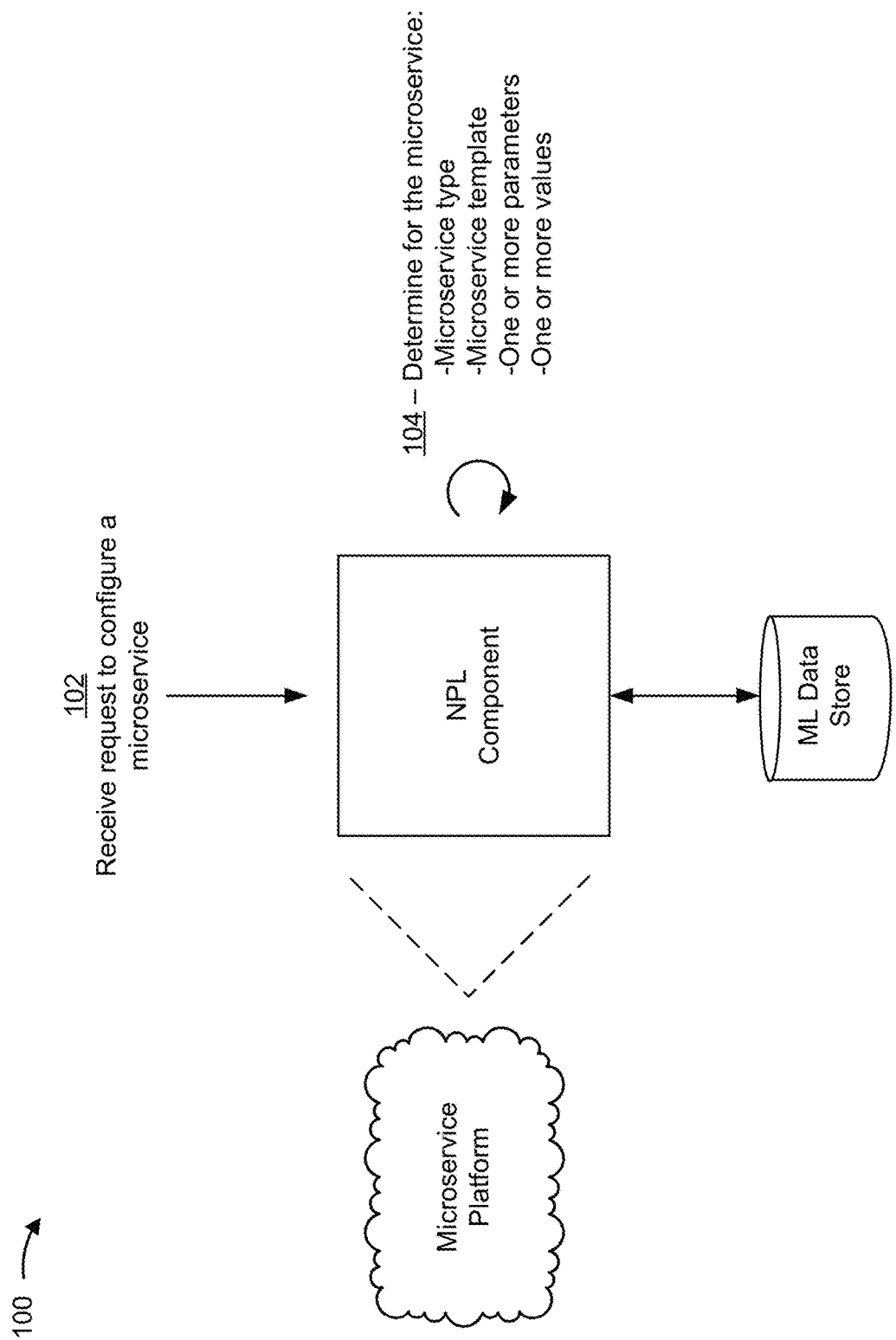

As shown in FIG. 1B, and by reference number 102, the microservice platform may receive requests to configure a microservice. The microservice platform may configure a reusable microservice to satisfy the request to configure the microservice.

In some implementations, the microservice platform may receive a request to configure a microservice from various sources, such as from an application-specific microservice, from an email, from input via a user interface of the microservice platform, from a chatbot, from a voice command, and/or other sources. In some implementations, the microservice platform may automatically configure a reusable microservice based on analyzing the application-specific microservices hosted by the MaaS client platform to determine the types of reusable microservices that are likely to be needed by the application-specific microservices.

As further shown in FIG. 1B, and by reference number 104, the microservice platform may use a natural language processing (NLP) component to determine a microservice type, a microservice template, one or more parameters, and one or more values for the one or more parameters. The microservice platform may use the microservice type, microservice template, the one or more parameters, and the one or more values to configure the reusable microservice for the microservice associated with the request.

The microservice type may be the type of reusable microservice that the microservice platform is to configure to satisfy the request. Examples of microservice types include an event microservice type, an authorization microservice type, an authentication microservice type, an audit microservice type, a notification microservice type, a transaction microservice type, an orchestration microservice type, a choreography microservice type, and/or other types of microservices.

A microservice template may be a template that is developed for configuring a reusable microservice for a particular microservice type. For example, an authorization template may be used to configure a reusable authorization microservice, an orchestration template may be used to configure a reusable orchestration microservice, and/or the like.

The one or more parameters for the microservice may indicate or specify parameters for the microservice platform that are capable of being provided by a reusable microservice for the microservice. As an example, the one or more parameters for an authentication microservice may include one or more parameters that indicate or specify the authentication types that are to be supported by a reusable authentication microservice, the authentication backend services that are to be supported by the reusable authentication microservice, the authentication credential types that are to be supported by the reusable authentication microservice, the types of authentication tokens to be generated by the reusable authentication microservice, and/or the like. As another example, the one or more parameters for an authorization microservice may include one or more parameters that indicate or specify the authorization types that are to be performed by a reusable authorization microservice, the backend services the reusable authorization microservice is to access to determine authorizations or permissions for users (or user devices), the user parameters to include in authorization tokens to be generated by the reusable authorization microservice, and/or the like.

As another example, the one or more parameters for an audit microservice may include one or more parameters that indicate or specify the audit information types that are to be stored by a reusable audit microservice, the event types that the reusable audit microservice is to log, the audit event types for which the reusable audit microservice is to provide notifications, and/or the like. As another example, the one or more parameters for a notification microservice may include one or more parameters that indicate or specify the event types for which a reusable notification microservice is to provide notifications, the notification types that the reusable notification microservice is to provide, and/or the like.

The one or more values for the microservice may indicate specific values for the one or more parameters. As an example, the one or more values may specify values for the authentication types (e.g., username and password for a user credential authentication type, public key infrastructure (PKI) for a key-based authentication type, and/or the like). As an example, the one or more values may specify values for the authentication backend services (e.g., Okta and an associated web address for an identity provider type of authentication backend service).

In some implementations, the microservice platform may use the NLP component to process the request to determine the microservice type, microservice template, the one or more parameters, and/or the one or more values for configuring the reusable microservice. In this case, the microservice platform may use the NLP component to analyze the request using natural language processing. For example, the NLP component may analyze the request using one or more natural language processing and/or machine learning models or algorithms to extract words from the request and to assign meanings to the words and/or to the context of the request.

In some implementations, the NLP component may analyze the request by using a language detector to detect a language of the request. In some implementations, the NLP component may analyze the request by using a parser application programming interface (API) and a tokenizer to parse the request to identify and tokenize one or more words or phrases (e.g., written words or phrases in a chatbot window or email, spoken words or phrases received by a voice assistant, and/or the like) included in the request.

In some implementations, the NLP component may use a natural language processing machine learning model, such as a naive Bayes classifier or another type of classifier machine learning model, to classify the identified words and/or phrases into different categories, such as microservice type (e.g., words and/or phrases that may indicate the microservice type associated with the request), microservice template (e.g., words and/or phrases that may indicate the particular microservice template to use when configuring the reusable microservice), parameters (e.g., words and/or phrases that may indicate the parameters that are to be used to configure the microservice associated with the request), values for the parameters (e.g., the specific values for the parameters identified in the request), and/or the like. The natural language processing machine learning model may be trained on historical classifications identified and/or confirmed in requests to configure microservices to increase the accuracy of the natural language processing machine learning model. Moreover, the natural language processing machine learning model may be trained on feedback from the provider of the request and/or providers of similar requests to further increase the accuracy of the natural language processing machine learning model. The historical classifications and feedback may be stored in a machine learning (ML) data store and may be retrieved by the NPL component from the ML data store.

Additionally and/or alternatively to using a natural language processing machine learning model, the microservice platform may determine the microservice template and/or the one or more parameters based on the microservice type of the microservice. For example, the microservice may identify the microservice template that is associated with the microservice type of the microservice, and may identify the one or more parameters identified in the microservice template.

Figure 1C:
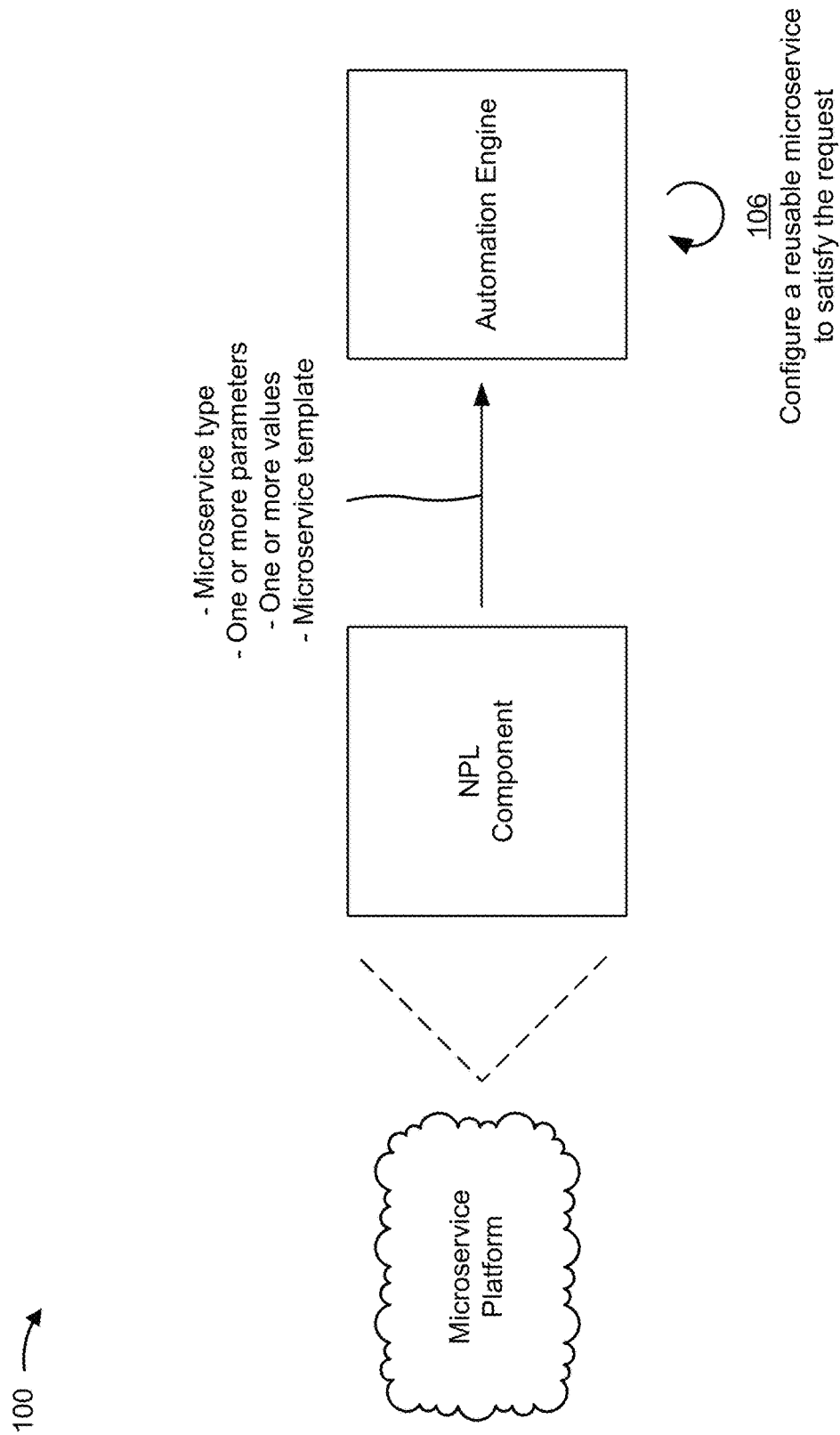

As shown in FIG. 1C, and by reference number 106, the microservice platform may configure a reusable microservice to satisfy the request to configure the microservice. In some implementations, the microservice platform may use an automation engine, which may include one or more components capable of automatically generating reusable microservices. The automation engine may automatically generate the reusable microservice based on the microservice type, the microservice template, the one or more parameters, and the one or more values determined and/or identified by the NLP component and/or microservice platform. In this case, the automation engine may automatically configure the reusable microservice from the microservice template associated with the microservice type to include capability of supporting the one or more parameters and values for the parameters.

In some implementations, the automation engine may further automatically deploy the reusable microservice on the microservice platform for use by application-specific microservices hosted by the MaaS client platform. Moreover, the automation engine may provide a notification to the MaaS client platform and/or the provider of the request that the request has been processed and that the reusable microservice is available for use. In some implementations, the automation engine may automatically test and/or debug the reusable microservice before deploying the reusable microservice.

Figure 1D:
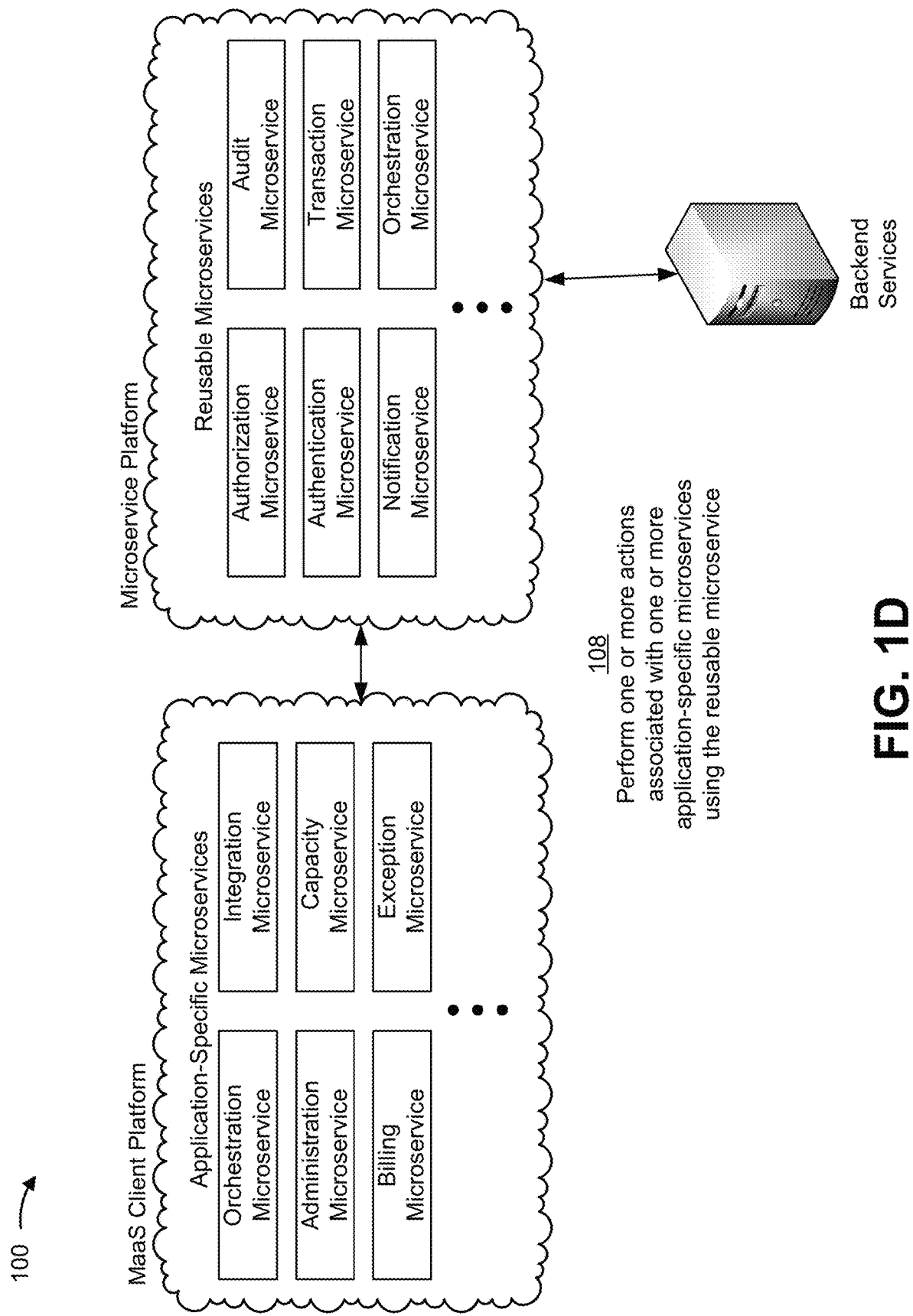

As shown in FIG. 1D, and by reference number 108, the microservice platform may perform one or more actions associated with one or more application-specific microservices using the reusable microservice. In some implementations, the microservice platform may perform one or more actions associated with one or more application-specific microservices using any of the reusable microservices hosted by the microservice platform. In some implementations, the one or more actions may include any of the various actions described below in connection with FIGS. 2A-2G and/or other actions.

In this way, the microservice platform is capable of using natural language processing and machine learning models to automatically configure a reusable microservice based on various types of input (e.g., text-based inputs, voice commands, structured and/or unstructured inputs, and/or the like). Each reusable microservice hosted by the microservice platform is capable of being used by a plurality of software applications and/or applications-specific microservices hosted by MaaS client platforms (e.g., clients of the MaaS provided by the microservice platform). In this way, the reusable microservices hosted by the microservice platform reduces the quantity of application-specific microservices that need to be developed for a particular software application, which reduces the amount of time and computing resources that are consumed in developing a software application relative to the development of application-specific microservices from scratch or from the ground up for use in the particular software application. Moreover, the reusable microservices hosted by the microservice platform reduces complexity of application-specific microservices that are used in software applications because common functionalities that are used across many application-specific microservices can be moved out of the development of the application-specific microservices and into a reusable microservices.

As indicated above, FIGS. 1A-1D are provided merely as one or more examples. Other examples may differ from what is described with regard to FIGS. 1A-1D.

FIGS. 2A-2G are diagrams of one or more example implementations 200 described herein. Example implementation(s) 200 may be example implementations of various reusable microservices that may be hosted by a microservice platform and used by application-specific microservices hosted by a MaaS client platform (e.g., a MaaS client of a MaaS provided by the microservices platform).

Figure 2A:
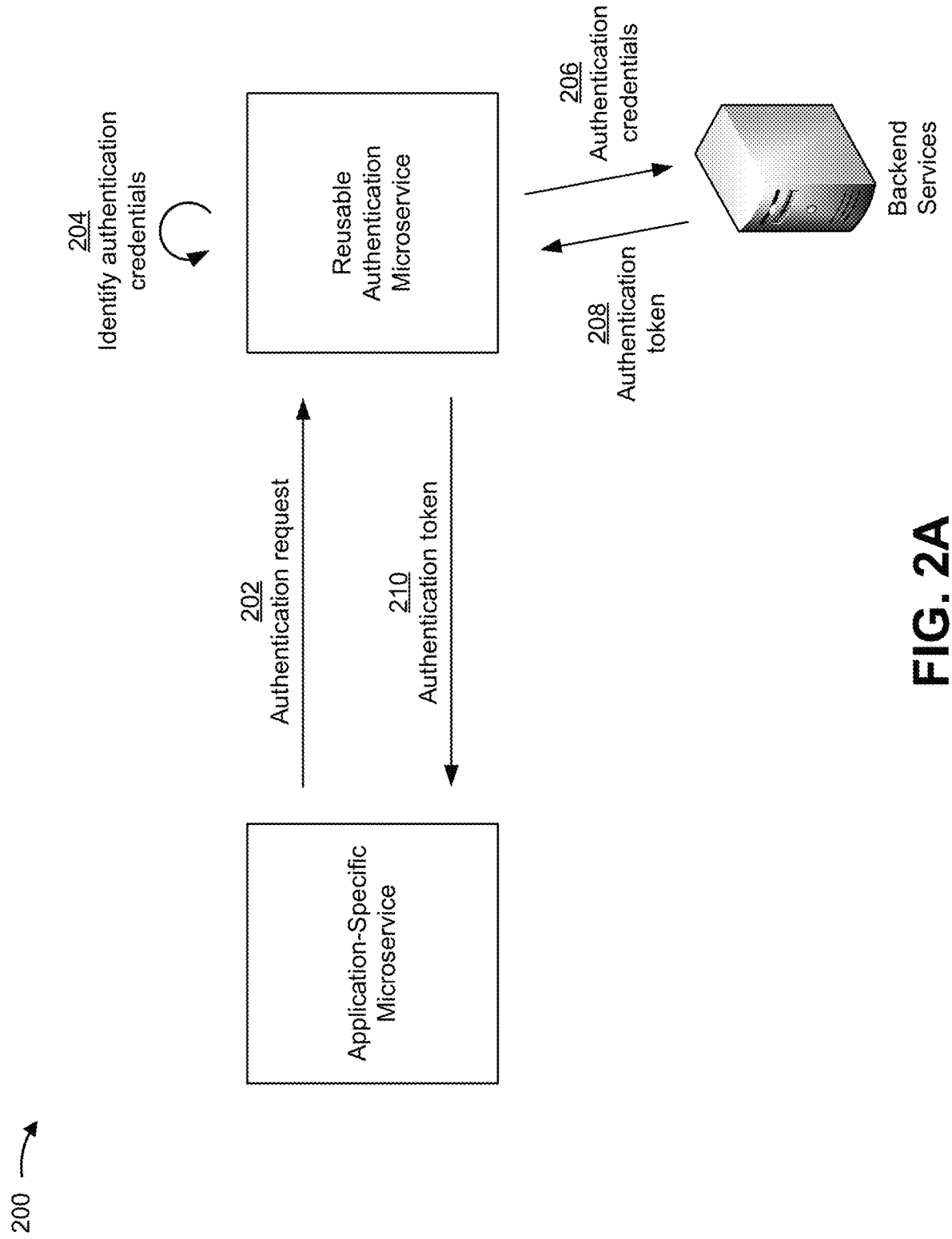

FIG. 2A illustrates one or more example implementations of a reusable authentication microservice. The reusable authentication microservice may provide authentication services to the application-specific microservices hosted by a MaaS client platform. The authentication services may include authenticating users, user devices, and/or other identities to provide access to one or more application-specific microservices, one or more software applications, one or more platforms associated with the one or more software applications, one or more functionalities provided by the one or more software applications, and/or the like.

As shown in FIG. 2A, and by reference number 202, the reusable authentication microservice may receive an authentication request from an application-specific microservice. In some implementations, the reusable authentication microservice may receive the authentication request from the application-specific microservice via an API (e.g., an API call), such as a REST API, a microservice API, and/or another type of API.

As further shown in FIG. 2A, and by reference number 204, the reusable authentication microservice may identify authentication credentials based on the authentication request. In some implementations, the reusable authentication microservice may use natural language processing to process the authentication request to identify the authentication credentials specified in the authentication request. In some implementations, the reusable authentication microservice may use natural language processing to process the authentication request to identify a location, specified in the authentication request, of where the authentication credentials are stored and can be retrieved. In some implementations, the authentication credentials may include a username and password, may include a token, may include a passcode, a software cookie, and/or the like.

As further shown in FIG. 2A, and by reference number 206, the reusable authentication microservice may transmit the authentication credentials to an authentication backend service (e.g., an identity provider or another type of authentication backend service) to authenticate a user, a user device, or another identity based on the authentication credentials. In some implementations, the reusable authentication microservice may use natural language processing to process the authentication request to identify the authentication backend service that is to be used to authenticate the user, the user device, or another identity. For example, the authentication backend service may be specified in the authentication request. As another example, the reusable authentication microservice may identify the authentication backend service based on determining that the authentication backend service provides an authentication type specified in the authentication request.

As further shown in FIG. 2A, and by reference number 208, the reusable authentication microservice may receive an authentication token from the authentication backend service. The authentication token may be associated with the user, the user device, or another identity that was authenticated by the authentication backend service. In some implementations, the reusable authentication microservice may receive the authentication token from the authentication backend service based on the authentication backend service successfully authenticating the authentication credentials of the user, the user device, or another identity.

As further shown in FIG. 2A, and by reference number 210, the reusable authentication microservice may provide the authentication token to the application-specific microservice to satisfy the authentication request. In some implementations, the reusable authentication microservice may provide the authentication token to the application-specific microservice based on receiving the authentication token from the authentication backend service. In some implementations, the reusable authentication microservice may provide the authentication token to the application-specific microservice via an API (e.g., an API call), such as a REST API, a microservice API, and/or another type of API.

Figure 2B:
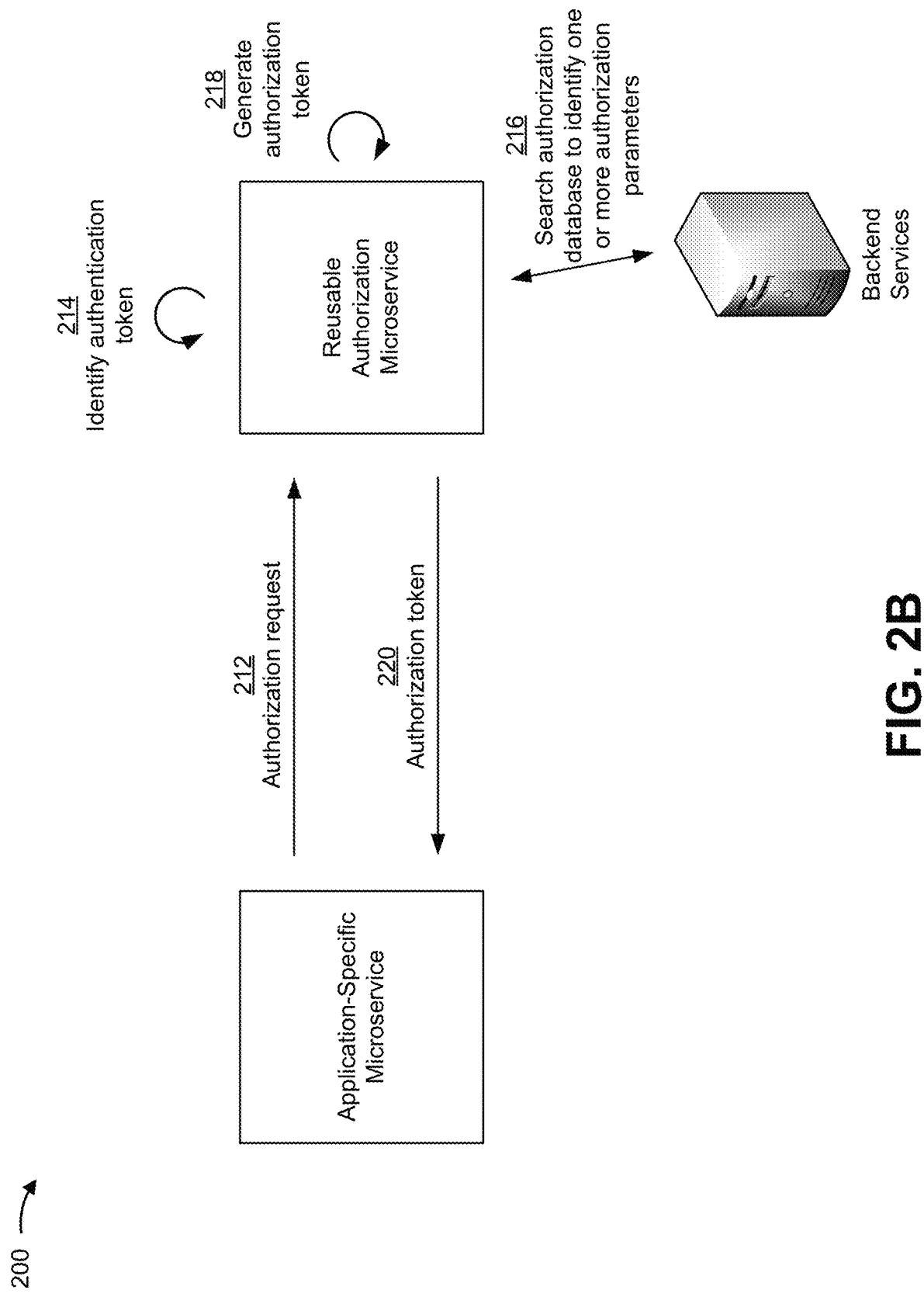

FIG. 2B illustrates one or more example implementations of a reusable authorization microservice. The reusable authorization microservice may provide authorization services to the application-specific microservices hosted by a MaaS client platform. The authorization services may include providing authorization information associated with users, user devices, and/or other identities to provide access to one or more application-specific microservices, one or more software applications, one or more platforms associated with the one or more software applications, one or more functionalities provided by the one or more software applications, and/or the like.

As shown in FIG. 2B, and by reference number 212, the reusable authorization microservice may receive an authorization request from an application-specific microservice. In some implementations, the reusable authorization microservice may receive the authorization request from the application-specific microservice via an API (e.g., an API call), such as a REST API, a microservice API, and/or another type of API.

As further shown in FIG. 2B, and by reference number 214, the reusable authorization microservice may identify an authorization token associated with the authentication request. In some implementations, the reusable authorization microservice may identify the authorization token included in the authorization request received from the application-specific microservice. In some implementations, the reusable authorization microservice may use natural language processing to process the authentication request to identify another microservice (e.g., a reusable authentication microservice) from which to request the authentication token.

As further shown in FIG. 2B, and by reference number 216, the reusable authorization microservice may search an authorization database provided by an authorization database backend service to identify one or more authorization parameters based on the authentication token. The reusable authorization microservice may identify the one or more authorization parameters included in the authorization database based on an identity (e.g., a user identity, a user device identity, or another identity) indicated in the authentication token. In this case, the reusable authorization microservice may search the authorization database to identify the authorizations or permissions of the identity to access and use various software applications, various application-specific microservices, and/or the like.

As further shown in FIG. 2B, and by reference number 218, the reusable authorization microservice may generate an authorization token for the identity associated with the authentication token. The authorization token may include user parameters associated with the identity, such as a role identifier associated with the identity, a group identifier associated with the identifier, a user identifier (or user device identifier) associated with the identity, and the one or more authorization parameters that identify the authorizations or permissions of the identity.

As further shown in FIG. 2B, and by reference number 220, the reusable authorization microservice may provide the authorization token to the application-specific microservice to satisfy the authorization request. In some implementations, the reusable authorization microservice may provide the authorization token to the application-specific microservice based on generating the authorization token. In some implementations, the reusable authorization microservice may provide the authorization token to the application-specific microservice via an API (e.g., an API call), such as a REST API, a microservice API, and/or another type of API.

Figure 2C:
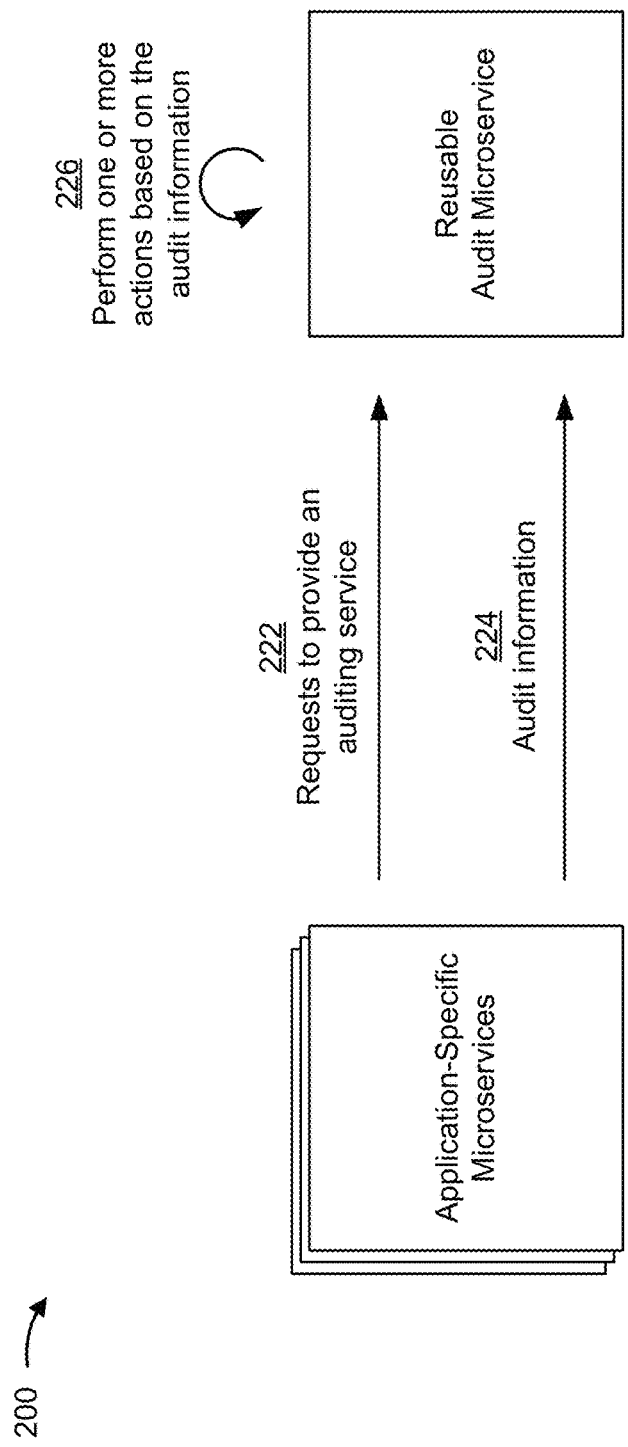

FIG. 2C illustrates one or more example implementations of a reusable audit microservice. The reusable audit microservice may provide audit services to the application-specific microservices hosted by a MaaS client platform. The audit services may include tracking, monitoring, and storing or logging audit information associated with events, transactions, and/or the like associated with the application-specific microservices, may include detecting audit events associated with the application-specific microservices, may include providing notifications to the application-specific microservices based on detecting an audit event, and/or the like.

As shown in FIG. 2C, and by reference number 222, the reusable audit microservice may receive one or more requests from one or more application-specific microservices to provide an auditing service for the one or more application-specific microservices. In some implementations, the reusable audit microservice may receive the one or more requests via an API (e.g., an API call), such as a REST API, a microservice API, and/or another type of API. The reusable audit microservice may activate the auditing service for each application-specific microservice for which a request to provide the auditing service is received.

As further shown in FIG. 2C, and by reference number 224, the reusable audit microservice may receive audit information from each application-specific microservice for which the auditing service was activated. Audit information may be associated with an event associated with an application-specific microservice, a transaction associated with an application-specific microservice, an audit of a process or code of an application-specific microservice, and/or the like. The audit information received from an application-specific microservice may include a timestamp (e.g., a date and time of the occurrence of an event, transaction, audit, and/or the like), a response time (e.g., a time of response for an event, transaction, audit, and/or the like), an endpoint invoked by the transaction, audit, and/or the like, a client identifier, a service identifier, and/or the like.

In some implementations, an application-specific microservice may provide audit information to the reusable audit microservice via an API (e.g., an API call), such as a REST API, a microservice API, and/or another type of API. In some implementations, an application-specific microservice may provide audit information to the reusable audit microservice via a message broker service, such as Kafka, RabbitMQ, Java message service, and/or the like.

As further shown in FIG. 2C, and by reference number 226, the reusable audit microservice may perform one or more actions based on the audit information received from the application-specific microservices. In some implementations, the reusable audit microservice may store the audit information in a data store (e.g., a local data store on the microservice platform, an audit database backend service, and/or the like). In some implementations, the reusable audit microservice may identify one or more audit events based on the audit information. In this case, the reusable audit microservice may perform a predictive analysis on the audit information to identify audit events.

The predictive analysis may include using an Elasticsearch, Logstash, and Kibana (ELK) stack to analyze events and transactions associated with an application-specific microservice before the events and transactions are executed or completed to determine whether an audit event will occur. For example, the reusable audit microservice may ingest audit information using Logstash, may store the audit information into an Elasticsearch data store, may explore, analyze, and visualize the audit information using Kibana. The reusable audit microservice may transmit one or more notifications to the application-specific microservice and/or other application-specific microservices based on identifying an audit event.

Figure 2D:
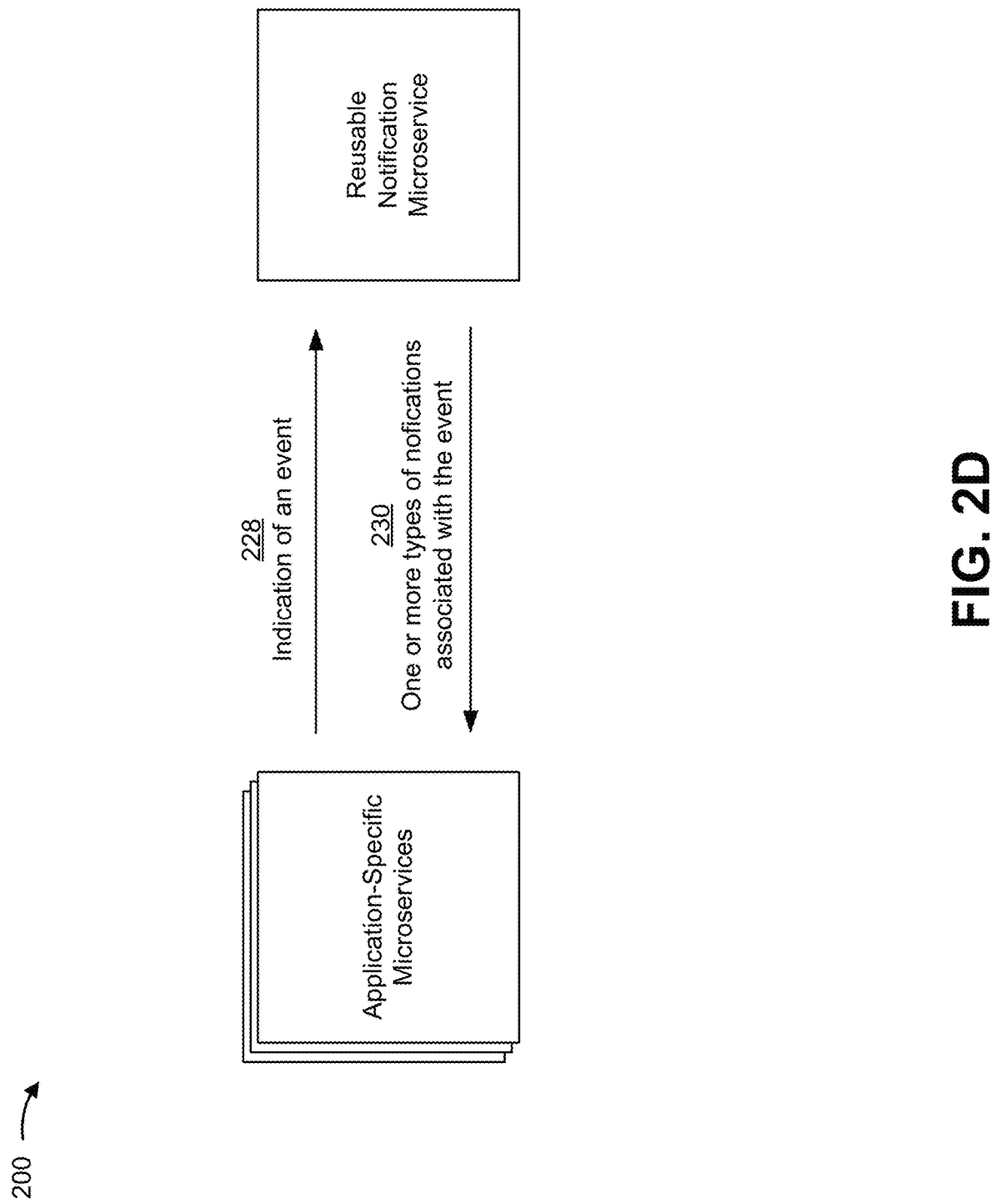

FIG. 2D illustrates one or more example implementations of a reusable notification microservice. The reusable notification microservice may provide notification services to the application-specific microservices hosted by a MaaS client platform. The notification services may include providing notifications for various types of events to application-specific microservices, to one or more users devices, to the MaaS client platform, and/or the like through various communication streams such as email, text (e.g., short messaging service (SMS) and/or the like), voice notifications, message broker services, web-based messaging, and/or the like.

As shown in FIG. 2D, and by reference number 228, the reusable notification microservice may receive an indication of an event. In some implementations, the reusable notification microservice may receive the indication of the event from an application-specific microservice. In some implementations, the reusable notification microservice may receive the indication of the event from a reusable microservice such as a reusable audit microservice, a reusable orchestration microservice, a reusable choreography microservice, and/or the like.

In some implementations, the reusable notification service may receive the indication of the event via an API (e.g., an API call), such as a REST API, a microservice API, and/or another type of API. In some implementations, the reusable notification service may receive the indication of the event via a message broker service, such as Kafka, RabbitMQ, Java message service, and/or the like.

As further shown in FIG. 2D, and by reference number 230, the reusable notification microservice may provide one or more types of notifications associated with the event. In some implementations, the reusable notification microservice may provide the one or more types of notifications associated to one or more application-specific microservices, to one or more users devices, to the MaaS client platform, and/or the like. In some implementations, the notification types may be based on the event type of the event, may be based on a configuration of the reusable notification microservice, and/or the like.

In some implementations, the reusable notification microservice may provide a notification of a particular notification type based on a template associated with the notification type. As an example, the reusable notification microservice may provide an email notification based on an email notification template. As an example, the reusable notification microservice may provide an SMS notification based on an SMS notification template.

Figure 2E:
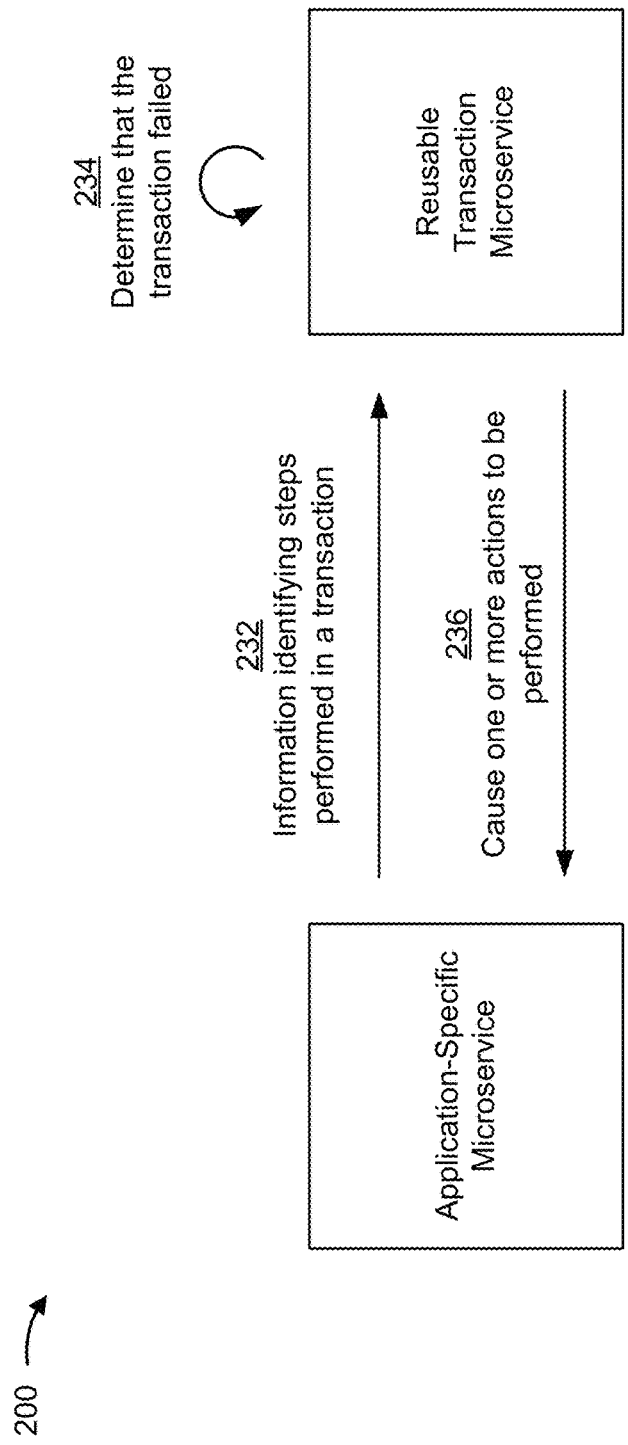

FIG. 2E illustrates one or more example implementations of a reusable transaction microservice. The reusable transaction microservice may provide transaction tracking services to the application-specific microservices hosted by a MaaS client platform. The transaction tracking services may include tracking the progress and/or steps of an in-process transaction, determining whether a transaction completed successfully, causing unsuccessful transactions to be reversed, causing one or more application-specific microservices and/or other reusable microservices to perform one or more actions, and/or the like.

As shown in FIG. 2E, and by reference number 232, the reusable transaction microservice may receive information identifying steps that are performed in a transaction from one or more application-specific microservices. In some implementations, the transaction may include various types of transactions, such as a merchant transaction, a bank transaction, a transaction between two or more application-specific microservices, and/or the like. In some implementations, the reusable transaction microservice may track the sequence of the steps in the transaction as the transaction is being performed.

In some implementations, the transaction notification service may receive the information identifying the steps that are performed in the transaction via an API (e.g., an API call), such as a REST API, a microservice API, and/or another type of API. In some implementations, the reusable transaction service may receive the information identifying the steps that are performed in the transaction via a message broker service, such as Kafka, RabbitMQ, Java message service, and/or the like.

As further shown in FIG. 2E, and by reference number 234, the reusable transaction microservice may determine that the transaction failed based on the information identifying steps performed in the transaction and based on tracking the sequence of steps. For example, the reusable transaction microservice may determine that the transaction failed based on determining that no response was receive at an entity device from another entity device in the transaction (e.g., based on determining that no response from a customer bank device was received at a payment interface device) and, thus, the transaction did not proceed to the next step in the sequence of steps.

As further shown in FIG. 2E, and by reference number 236, the reusable transaction microservice may cause one or more application-specific microservices and/or one or more other reusable microservices to perform one or more actions based on determining that the transaction failed. For example, the reusable transaction microservice may cause one or more application-specific microservices and/or one or more other reusable microservices to reverse the transaction. As another example, the reusable transaction microservice may cause one or more application-specific microservices and/or one or more other reusable microservices to reperform the transaction (e.g., after reversing the transaction).

Figure 2F:
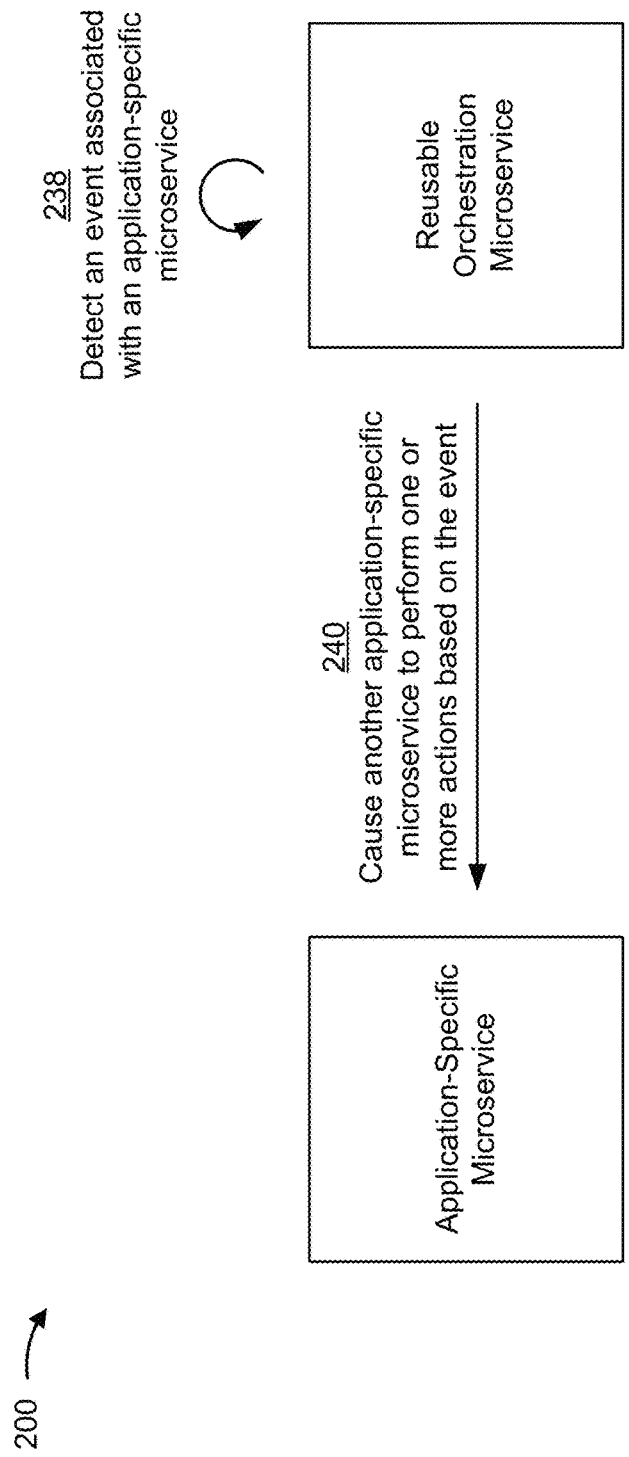

FIG. 2F illustrates one or more example implementations of a reusable orchestration microservice. The reusable orchestration microservice may provide orchestration services to the application-specific microservices hosted by a MaaS client platform. The orchestration services may include orchestrating the interaction of application-specific microservices, orchestrating transactions between application-specific microservices, orchestrating actions of application-specific microservices, and/or the like.

As shown in FIG. 2F, and by reference number 238, the reusable orchestration microservice may detect an event associated with an application-specific microservice. For example, the reusable orchestration microservice may use an event bus to orchestrate events to and from various application-specific microservices. In some implementations, the reusable orchestration microservice may use a machine learning model to detect the event. The machine learning model may be trained on historical event data (e.g., information identifying one or more indicators or symptoms associated with various types of events). The reusable orchestration microservice may use the machine learning model to determine an estimated health of the application-specific microservice (e.g., based on detecting various indicators or symbols that are occurring with the application-specific microservice), and may detect the event based on the estimated health of the application-specific microservice. For example, the reusable orchestration microservice may detect the event based on determining that the estimated health of the application-specific microservice does not satisfy a health threshold.

As further shown in FIG. 2F, and by reference number 240, the reusable orchestration microservice may cause another application-specific microservice to perform one or more actions based on the event. The reusable orchestration microservice may use a message adapter to transmit instructions to perform the one or more actions to the other application-specific microservice.

In some implementations, the reusable orchestration microservice may use a machine learning model to determine particular actions or sequences of actions that are to be performed based on the event. The machine learning model may be trained on historical event data (e.g., information identifying one or more historical actions taken based on the event, the outcomes of the one or more historical actions, user feedback on the one or more historical actions and/or the outcomes, and/or the like).

Figure 2G:
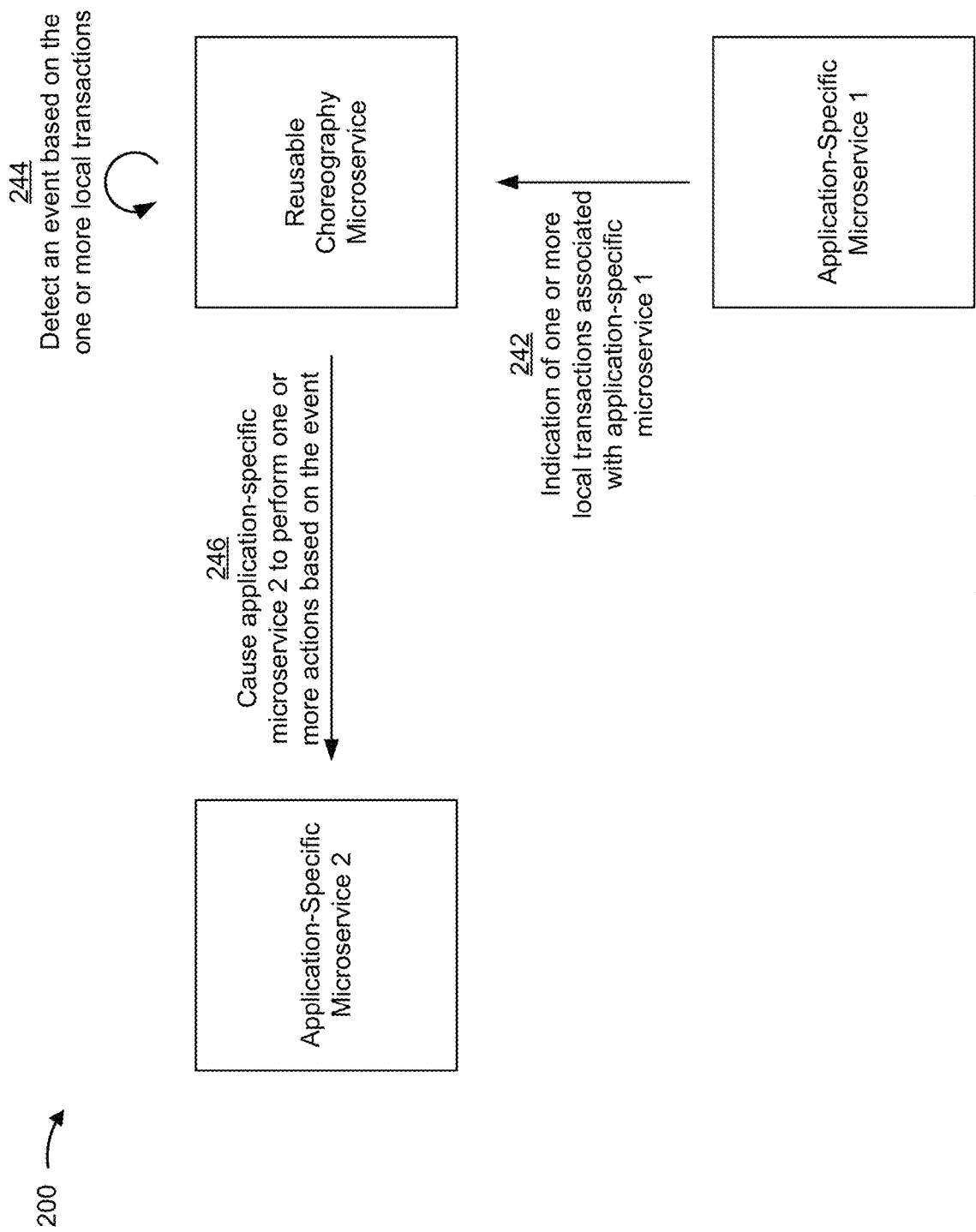

FIG. 2G illustrates one or more example implementations of a reusable choreography microservice. The reusable choreography microservice may provide choreography services to the application-specific microservices hosted by a MaaS client platform. The choreography services may include choreographing the interaction of application-specific microservices, choreographing transactions between application-specific microservices, choreographing actions of application-specific microservices, and/or the like.

As shown in FIG. 2G, and by reference number 242, the reusable choreography microservice may receive an indication of one or more local transactions associated with application-specific microservice 1. The one or more local transactions may be performed by application-specific microservice 1. In some implementations, the reusable choreography microservice may receive an indication after each local transaction is performed. In some implementations, application-specific microservice 1 may provide the indication of the one or more local transactions after a particular sequence of transactions is performed.

As further shown in FIG. 2G, and by reference number 244, the reusable choreography microservice may detect an event associated with application-specific microservice 1 based on the one or more local transactions. For example, the reusable choreography microservice may use an event bus to choreograph events to and from various application-specific microservices. In some implementations, the reusable choreography microservice may use a machine learning model to detect the event. The machine learning model may be trained on historical event data (e.g., information identifying one or more local transactions associated with various types of events). The reusable choreography microservice may use the machine learning model to determine an estimated health of application-specific microservice 1 based on the one or more local transactions, and may detect the event based on the estimated health of application-specific microservice 1. For example, the reusable choreography microservice may detect the event based on determining that the estimated health of application-specific microservice 1 does not satisfy a health threshold.

As further shown in FIG. 2G, and by reference number 246, the reusable choreography microservice may cause application-specific microservice 2 to perform one or more actions based on the event associated with application-specific microservice 1. The reusable orchestration microservice may use a message adapter to transmit instructions to perform the one or more actions to the other application-specific microservice 2.

In some implementations, the reusable orchestration microservice may use a machine learning model to determine particular actions or sequences of actions that are to be performed based on the event. The machine learning model may be trained on historical event data (e.g., information identifying one or more historical actions taken based on the event, the outcomes of the one or more historical actions, user feedback on the one or more historical actions and/or the outcomes, and/or the like).

As indicated above, FIGS. 2A-2G are provided merely as one or more examples. Other examples may differ from what is described with regard to FIGS. 2A-2G.

Figure 3:
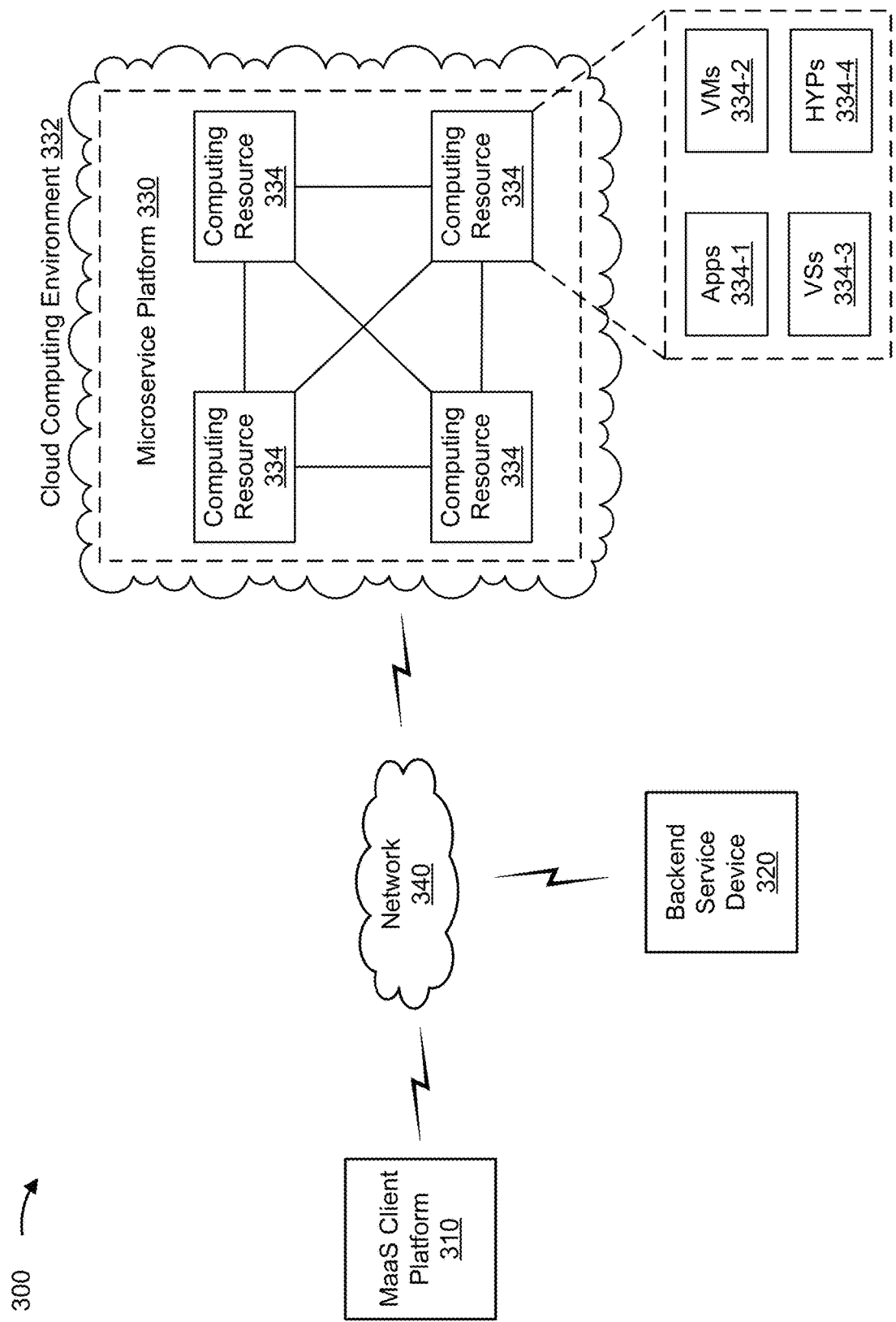
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a MaaS client platform 310, a backend service device 320, a microservice platform 330, and a network 340. Devices of environment 300 may interconnect via wired connections, wireless connections, or a combination of wired and wireless connections.

MaaS client platform 310 includes one or more devices capable of receiving, generating, storing, processing, and/or providing information, such as information described herein. For example, MaaS client platform 310 may include a mobile phone (e.g., a smart phone, a radiotelephone, and/or the like), a laptop computer, a tablet computer, a handheld computer, a desktop computer, a server device, a data center, a platform implemented in a cloud computing environment, an on-premise platform or a similar type of device.

In some implementations, MaaS client platform 310 may host one or more application-specific microservices (e.g., microservices that were developed from scratch or from the ground up for a particular software application). In some implementations, the application-specific microservices hosted by MaaS client platform 310 may communicate with microservice platform 330 via network 340 to request that one or more reusable microservices (e.g., microservices that are developed and configured for use by a plurality of software applications and/or a plurality of application-specific microservices) be configured by microservice platform 330. In some implementations, the application-specific microservices hosted by MaaS client platform 310 may communicate with microservice platform 330 via network 340 to access one or more reusable microservices hosted by microservice platform 330. The application-specific microservices hosted by MaaS client platform 310 may communicate with microservice platform 330 via network 340 to provide information associated with one or more application-specific microservices hosted by MaaS platform 310, such as audit information, authentication tokens, input for configuring a reusable microservice, and/or the like. The application-specific microservices hosted by MaaS client platform 310 may communicate with microservice platform 330 via network 340 to receive information, such as notifications associated with a transaction of an application-specific microservice, notifications associated with an event of an application-specific microservice, instructions to cause one or more application-specific microservices to perform one or more actions, and/or the like.

Backend services device 320 includes one or more devices capable of receiving, storing, and/or providing information, such as information described herein. For example, backend services device 320 may include a server device, a desktop computer, a cloud-based platform hosted in a cloud computing platform, an on-premise platform, or a similar type of device. In some implementations, backend services device 320 host one or more backend services that may be used by the reusable microservices hosted by microservice platform 330. In some implementations, the backend services may include identity provider services and/or other types of authentication services, authorization database services, message brokering services, and/or the like.

Microservice platform 330 includes one or more devices capable of hosting one or more reusable microservices, capable of configuring reusable microservices for use by one or more application-specific microservices hosted by MaaS client platform 310, capable of using one or more reusable microservices hosted by microservice platform 330 to perform one or more actions associated with the application-specific microservices hosted by MaaS client platform 310, capable of communicating with one or more backend services hosted by backend services device 320 via network 340 to perform the one or more actions, and/or the like.

In some implementations, microservices platform 330 may be designed to be modular such that certain software components may be swapped in or out depending on a particular need. As such, microservices platform 330 may be easily and/or quickly reconfigured for different uses. In some implementations, microservices platform 330 may receive information from and/or transmit information to MaaS client platform 310, backend services device 320, and/or the like.

In some implementations, as shown, microservices platform 330 may be hosted in a cloud computing environment 332. Notably, while implementations described herein describe microservices platform 330 as being hosted in cloud computing environment 332, in some implementations, microservices platform 330 may not be cloud-based (i.e., may be implemented outside of a cloud computing environment) or may be partially cloud-based. Cloud computing environment 332 includes an environment that hosts microservices platform 330. Cloud computing environment 332 may provide computation, software, data access, storage, etc. services that do not require end-user knowledge of a physical location and configuration of system(s) and/or device(s) that hosts microservices platform 330. As shown, cloud computing environment 332 may include a group of computing resources 334 (referred to collectively as "computing resources 334" and individually as "computing resource 334").

Computing resource 334 includes one or more personal computers, workstation computers, server devices, or other types of computation and/or communication devices. In some implementations, computing resource 334 may host microservices platform 330. The cloud resources may include compute instances executing in computing resource 334, storage devices provided in computing resource 334, data transfer devices provided by computing resource 334, etc. In some implementations, computing resource 334 may communicate with other computing resources 334 via wired connections, wireless connections, or a combination of wired and wireless connections.

As further shown in FIG. 3, computing resource 334 includes a group of cloud resources, such as one or more applications ("APPs") 334-1, one or more virtual machines ("VMs") 334-2, virtualized storage ("VSs") 334-3, one or more hypervisors ("HYPs") 334-4, and/or the like.

Application 334-1 includes one or more software applications that may be provided to or accessed by one or more other devices. Application 334-1 may eliminate a need to install and execute the software applications on the one or more other devices. For example, application 334-1 may include software associated with microservice platform 330 and/or any other software capable of being provided via cloud computing environment 332. In some implementations, one application 334-1 may send/receive information to/from one or more other applications 334-1, via virtual machine 334-2.

Virtual machine 334-2 includes a software implementation of a machine (e.g., a computer) that executes programs like a physical machine. Virtual machine 334-2 may be either a system virtual machine or a process virtual machine, depending upon use and degree of correspondence to any real machine by virtual machine 334-2. A system virtual machine may provide a complete system platform that supports execution of a complete operating system ("OS"). A process virtual machine may execute a single program, and may support a single process. In some implementations, virtual machine 334-2 may execute on behalf of a user (e.g., a user of another device or an operator of microservices platform 330), and may manage infrastructure of cloud computing environment 332, such as data management, synchronization, or long-duration data transfers.

Virtualized storage 334-3 includes one or more storage systems and/or one or more devices that use virtualization techniques within the storage systems or devices of computing resource 334. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 334-4 may provide hardware virtualization techniques that allow multiple operating systems (e.g., "guest operating systems") to execute concurrently on a host computer, such as computing resource 334. Hypervisor 334-4 may present a virtual operating platform to the guest operating systems, and may manage the execution of the guest operating systems. Multiple instances of a variety of operating systems may share virtualized hardware resources.

Network 340 includes one or more wired and/or wireless networks. For example, network 340 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
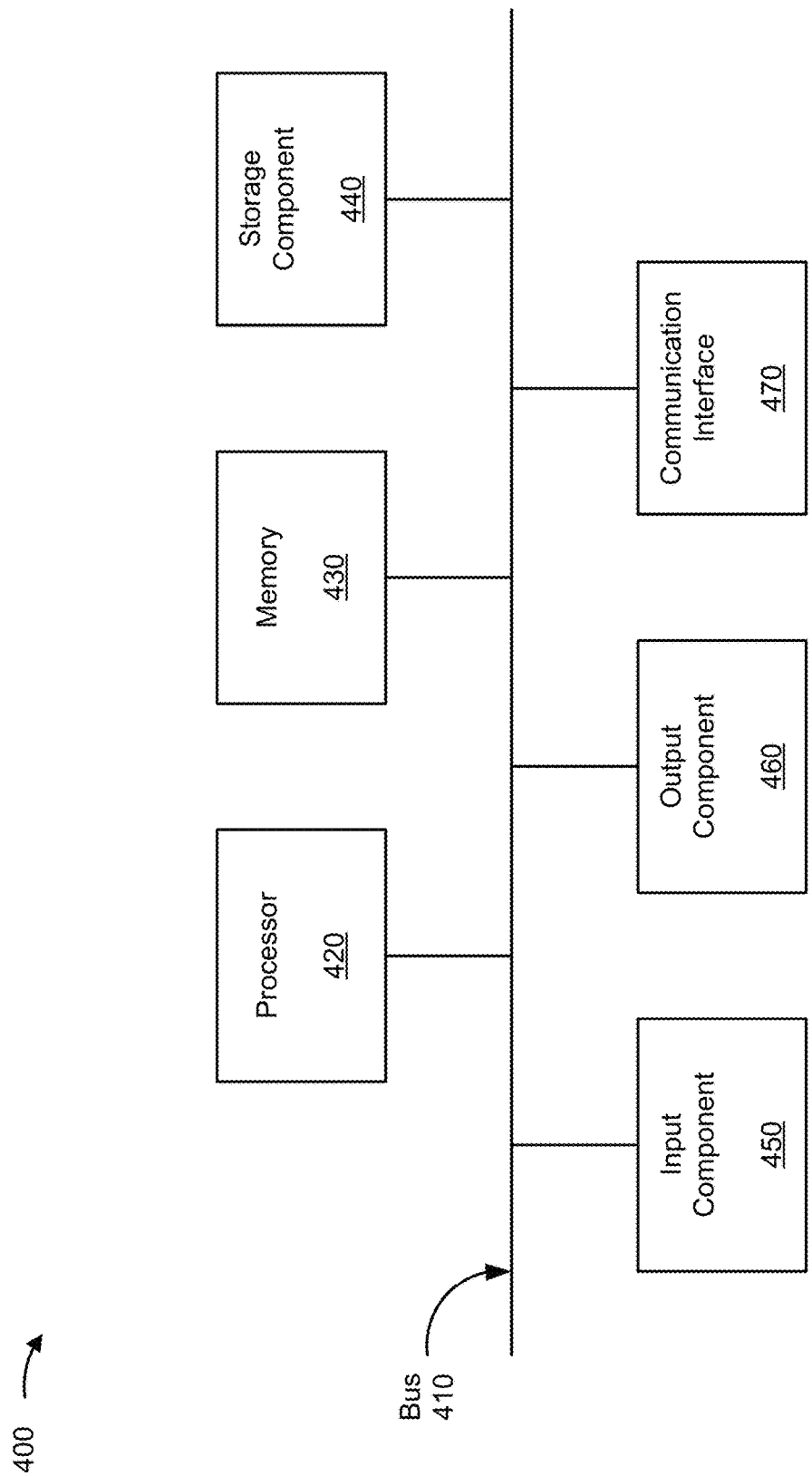
FIG. 4 is a diagram of example components of one or more devices of FIG. 3.

FIG. 4 is a diagram of example components of a device 400. Device 400 may correspond to MaaS client platform 310, backend service device 320, microservice platform 330, computing resource 334, and/or one or more devices included in network 340. In some implementations, MaaS client platform 310, backend service device 320, microservice platform 330, computing resource 334, and/or one or more devices included in network 340 may include one or more devices 400 and/or one or more components of device 400. As shown in FIG. 4, device 400 may include a bus 410, a processor 420, a memory 430, a storage component 440, an input component 450, an output component 460, and/or a communication interface 470.

Bus 410 includes a component that permits communication among multiple components of device 400. Processor 420 is implemented in hardware, firmware, and/or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
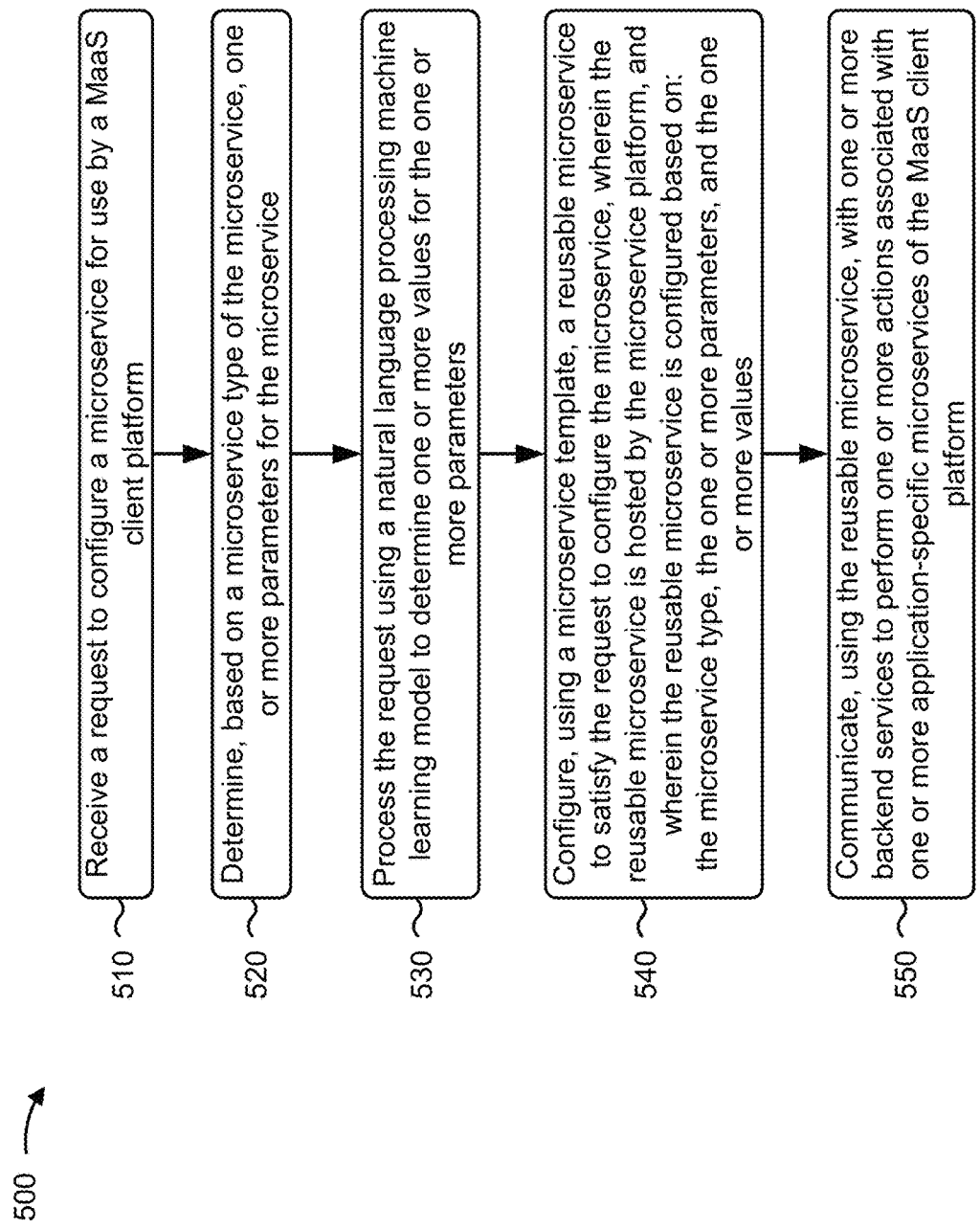

FIG. 5 is a flow chart of an example process 500 for configuring a reusable microservice. In some implementations, one or more process blocks of FIG. 5 may be performed by a microservice platform (e.g., microservice platform 330, device 400, and/or the like). In some implementations, one or more process blocks of FIG. 5 may be performed by another device or a group of devices separate from or including the microservice platform, such as a MaaS client platform (e.g., MaaS client platform 310), a backend service device (e.g., backend service device 320), and/or the like.

As shown in FIG. 5, process 500 may include receiving a request to configure a microservice for use by a MaaS client platform (block 510). For example, the microservice platform (e.g., using processor 420, memory 430, storage component 440, input component 450, output component 460, communication interface 470 and/or the like) may receive a request to configure a microservice for use by a MaaS client platform, as described above.

As further shown in FIG. 5, process 500 may include determining, based on a microservice type of the microservice, one or more parameters for the microservice (block 520). For example, the microservice platform (e.g., using processor 420, memory 430, storage component 440, input component 450, output component 460, communication interface 470 and/or the like) may determine, based on a microservice type of the microservice, one or more parameters for the microservice, as described above.

As further shown in FIG. 5, process 500 may include processing the request using a natural language processing machine learning model to determine one or more values for the one or more parameters (block 530). For example, the microservice platform (e.g., using processor 420, memory 430, storage component 440, input component 450, output component 460, communication interface 470 and/or the like) may process the request using a natural language processing machine learning model to determine one or more values for the one or more parameters, as described above.

As further shown in FIG. 5, process 500 may include configuring, using a microservice template, a reusable microservice to satisfy the request to configure the microservice, wherein the reusable microservice is hosted by the microservice platform, and wherein the reusable microservice is configured based on: the microservice type, the one or more parameters, and the one or more values (block 540). For example, the microservice platform (e.g., using processor 420, memory 430, storage component 440, input component 450, output component 460, communication interface 470 and/or the like) may configure, using a microservice template, a reusable microservice to satisfy the request to configure the microservice, as described above. In some implementations, the reusable microservice is hosted by the microservice platform. In some implementations, the reusable microservice is configured based on the microservice type, the one or more parameters, and the one or more values.

As further shown in FIG. 5, process 500 may include communicating, using the reusable microservice, with one or more backend services to perform one or more actions associated with one or more application-specific microservices of the MaaS client platform (block 550). For example, the microservice platform (e.g., using processor 420, memory 430, storage component 440, input component 450, output component 460, communication interface 470 and/or the like) may communicate, using the reusable microservice, with one or more backend services to perform one or more actions associated with one or more application-specific microservices of the MaaS client platform, as described above.

Process 500 may include additional implementations, such as any single implementation or any combination of implementations described below and/or in connection with one or more other processes described elsewhere herein.

In a first implementation, the microservice type comprises an event microservice type, an authorization microservice type, an authentication microservice type, an audit microservice type, a notification microservice type, a transaction microservice type, an orchestration microservice type, or a choreography microservice type. In a second implementation, alone or in combination with the first implementation, the microservice type is an authentication microservice type, the reusable microservice is a reusable authentication microservice, and the one or more parameters comprise at least one of one or more authentication types to be supported by the reusable authentication microservice, one or more authentication backend services to be supported by the reusable authentication microservice, one or more authentication credential types to be supported by the reusable authentication microservice, or one or more types of authentication tokens to be generated by the reusable authentication microservice.

In a third implementation, alone or in combination with one or more of the first and second implementations, the microservice type is an authentication microservice type, the reusable microservice is a reusable authentication microservice, and communicating with the one or more backend services to perform the one or more actions comprises receiving, using the reusable authentication microservice, an authentication request from an application-specific microservice of the one or more application-specific microservices; identifying, using the reusable authentication microservice, authentication credentials in the authentication request; transmitting, using the reusable authentication microservice, the authentication credentials to an authentication backend service; and receiving, using the reusable authentication microservice and based on transmitting the authentication credentials, an authentication token from the authentication backend service. In a fourth implementation, alone or in combination with one or more of the first through third implementations, the microservice type is an authorization microservice type, the reusable microservice is a reusable authorization microservice, and the one or more parameters comprise at least one of: one or more authorization types that are to be performed by the reusable authorization microservice, which of the one or more backend services the reusable authorization microservice is to access to determine authorization of a user, or one or more user parameters to include in authorization tokens to be generated by the reusable authorization microservice.

In a fifth implementation, alone or in combination with one or more of the first through fourth implementations, the microservice type is an authorization microservice type, the reusable microservice is a reusable authorization microservice, and communicating with the one or more backend services to perform the one or more actions comprises receiving, using the reusable authorization microservice, an authorization request from an application-specific microservice of the one or more application-specific microservices, the authorization request is associated with a user; identifying, using the reusable authorization microservice, an authentication token in the authorization request, the authentication token is associated with the user; searching, using the reusable authorization microservice, an authorization database backend service to identify one or more authorization parameters for the user; generating, for the user and using the reusable authorization microservice, an authorization token that includes information identifying the one or more authorization parameters; and transmitting, using the reusable authorization microservice, the authorization token to the application-specific microservice. In a sixth implementation, alone or in combination with one or more of the first through fifth implementations, process 500 includes identifying the microservice template based on the microservice type.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
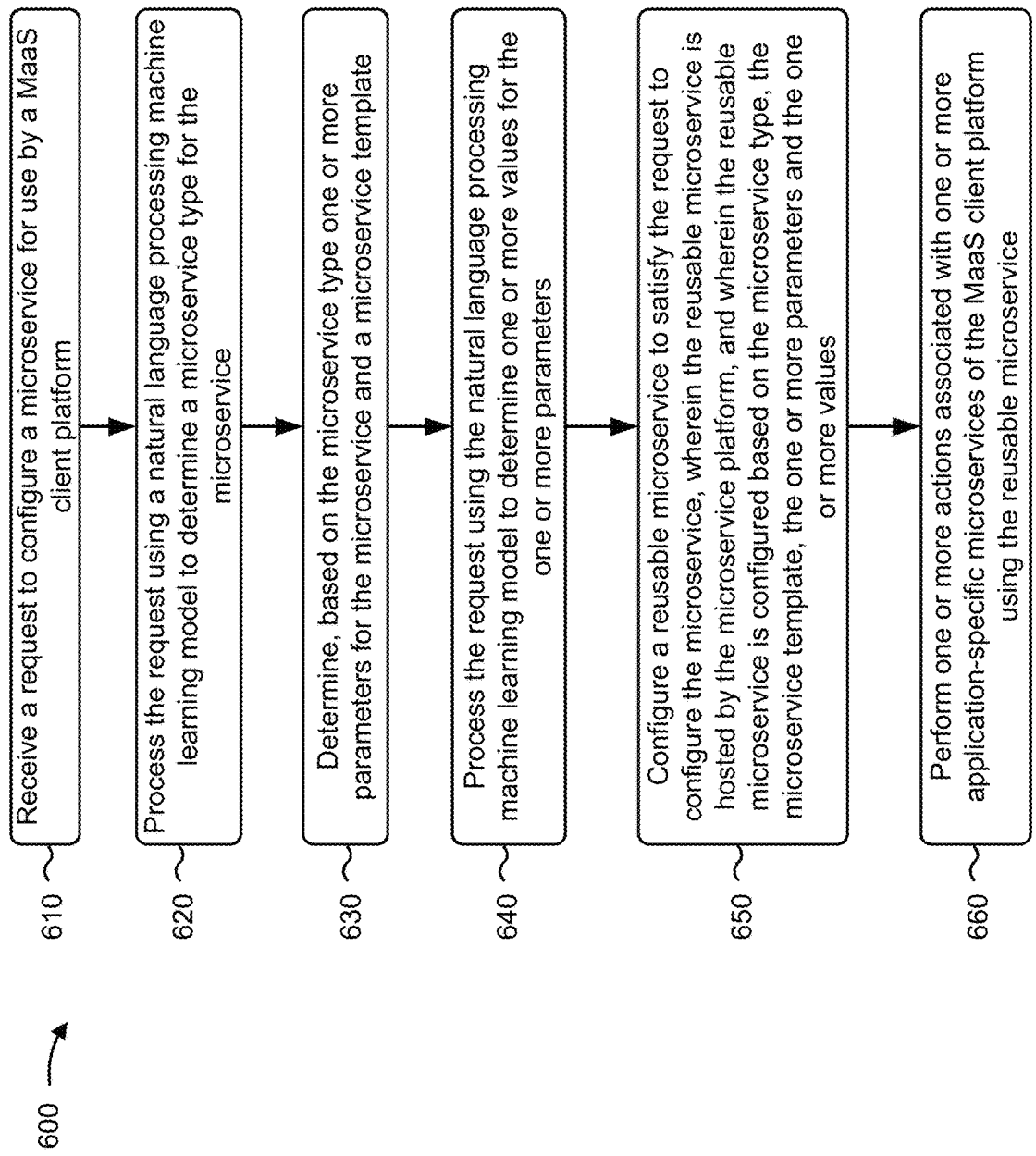

FIG. 6 is a flow chart of an example process 600 for configuring a reusable microservice. In some implementations, one or more process blocks of FIG. 6 may be performed by a microservice platform (e.g., microservice platform 330, device 400, and/or the like). In some implementations, one or more process blocks of FIG. 6 may be performed by another device or a group of devices separate from or including the microservice platform, such as a MaaS client platform (e.g., MaaS client platform 310), a backend service device (e.g., backend service device 320), and/or the like.

As shown in FIG. 6, process 600 may include receiving a request to add a microservice to a MaaS client platform (block 610). For example, the microservice platform (e.g., using processor 420, memory 430, storage component 440, input component 450, output component 460, communication interface 470 and/or the like) may receive a request to add a microservice to a MaaS client platform, as described above.

As further shown in FIG. 6, process 600 may include processing the request using a natural language processing machine learning model to determine a microservice type for the microservice (block 620). For example, the microservice platform (e.g., using processor 420, memory 430, storage component 440, input component 450, output component 460, communication interface 470 and/or the like) may process the request using a natural language processing machine learning model to determine a microservice type for the microservice, as described above.

As further shown in FIG. 6, process 600 may include determining, based on the microservice type, one or more parameters for the microservice and a microservice template (block 630). For example, the microservice platform (e.g., using processor 420, memory 430, storage component 440, input component 450, output component 460, communication interface 470 and/or the like) may determine, based on the microservice type, one or more parameters for the microservice and a microservice template, as described above.

As further shown in FIG. 6, process 600 may include processing the request using the natural language processing machine learning model to determine one or more values for the one or more parameters (block 640). For example, the microservice platform (e.g., using processor 420, memory 430, storage component 440, input component 450, output component 460, communication interface 470 and/or the like) may process the request using the natural language processing machine learning model to determine one or more values for the one or more parameters, as described above.

As further shown in FIG. 6, process 600 may include configuring a reusable microservice to satisfy the request to configure the microservice, wherein the reusable microservice is hosted by the microservice platform, and wherein the reusable microservice is configured based on the microservice type, the microservice template, the one or more parameters, and the one or more values (block 650). For example, the microservice platform (e.g., using processor 420, memory 430, storage component 440, input component 450, output component 460, communication interface 470 and/or the like) may configure a reusable microservice to satisfy the request to configure the microservice, as described above. In some implementations, the reusable microservice is hosted by the microservice platform. In some implementations, the reusable microservice is configured based on the microservice type, the microservice template, the one or more parameters, and the one or more values.

As further shown in FIG. 6, process 600 may include performing one or more actions associated with one or more application-specific microservices of the MaaS client platform using the reusable microservice (block 660). For example, the microservice platform (e.g., using processor 420, memory 430, storage component 440, input component 450, output component 460, communication interface 470 and/or the like) may perform one or more actions associated with one or more application-specific microservices of the MaaS client platform using the reusable microservice, as described above.

Process 600 may include additional implementations, such as any single implementation or any combination of implementations described below and/or in connection with one or more other processes described elsewhere herein.

In a first implementation, the microservice type is an audit microservice, the reusable microservice is a reusable audit microservice, and the one or more parameters comprise at least one of one or more audit information types that are to be stored by the reusable audit microservice, one or more event types that the reusable audit microservice is to log, or one or more event types for which the reusable audit microservice is to provide notifications. In a second implementation, alone or in combination with the first implementation, the microservice type is an audit microservice type, the reusable microservice is a reusable audit microservice, and performing the one or more actions comprises receiving, using the reusable audit microservice, requests from the one or more application-specific microservices to provide an auditing service for the one or more application-specific microservices; receiving, using the reusable audit microservice and based on receiving the request, audit information associated with the one or more application-specific microservices; and at least one of storing the audit information in a data store, identifying one or more audit events based on the audit information, or transmitting one or more notifications based on the one or more audit events.

In a third implementation, alone or in combination with one or more of the first and second implementations, identifying the one or more audit events based on the audit information comprises performing, using the reusable audit microservice, a predictive analysis on the audit information to identify the one or more audit events, the predictive analysis being performed using an ELK stack. In a fourth implementation, alone or in combination with one or more of the first through third implementations, the microservice type is a notification microservice type, the reusable microservice is a reusable notification microservice, and the one or more parameters comprise at least one of one or more event types for which the reusable notification microservice is to provide notifications, or one or more notification types that the reusable notification microservice is to provide.

In a fifth implementation, alone or in combination with one or more of the first through fourth implementations, the microservice type is a notification microservice type, the reusable microservice is a reusable notification microservice, and performing one or more actions comprises receiving, using the reusable notification microservice, an indication of an event associated with the one or more application-specific microservices; and providing, using the reusable notification microservice, one or more types of notifications associated with the event. In a sixth implementation, alone or in combination with one or more of the first through fifth implementations, receiving the indication of the event comprises receiving the indication of the event from a message broker service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for configuring a reusable microservice. In some implementations, one or more process blocks of FIG. 7 may be performed by a microservice platform (e.g., microservice platform 330, device 400, and/or the like). In some implementations, one or more process blocks of FIG. 7 may be performed by another device or a group of devices separate from or including the microservice platform, such as a MaaS client platform (e.g., MaaS client platform 310), a backend service device (e.g., backend service device 320), and/or the like.

As shown in FIG. 7, process 700 may include receiving a request to add a microservice to a MaaS client platform (block 710). For example, the microservice platform (e.g., using processor 420, memory 430, storage component 440, input component 450, output component 460, communication interface 470 and/or the like) may receive a request to add a microservice to a MaaS client platform, as described above.

As further shown in FIG. 7, process 700 may include processing the request using a natural language processing machine learning model to determine a microservice type for the microservice (block 720). For example, the microservice platform (e.g., using processor 420, memory 430, storage component 440, input component 450, output component 460, communication interface 470 and/or the like) may process the request using a natural language processing machine learning model to determine a microservice type for the microservice, as described above.

As further shown in FIG. 7, process 700 may include determining, based on the microservice type, one or more parameters for the microservice, and a microservice template (block 730). For example, the microservice platform (e.g., using processor 420, memory 430, storage component 440, input component 450, output component 460, communication interface 470 and/or the like e) may determine, based on the microservice type, one or more parameters for the microservice and a microservice template, as described above.

As further shown in FIG. 7, process 700 may include determining one or more values for the one or more parameters (block 740). For example, the microservice platform (e.g., using processor 420, memory 430, storage component 440, input component 450, output component 460, communication interface 470 and/or the like) may determine one or more values for the one or more parameters, as described above.

As further shown in FIG. 7, process 700 may include configuring a reusable microservice to satisfy the request to configure the microservice, wherein the reusable microservice is configured based on the microservice type, the microservice template, the one or more parameters, and the one or more values (block 750). For example, the microservice platform (e.g., using processor 420, memory 430, storage component 440, input component 450, output component 460, communication interface 470 and/or the like) may configure a reusable microservice to satisfy the request to configure the microservice, as described above. In some implementations, the reusable microservice is configured based on the microservice type, the microservice template, the one or more parameters, and the one or more values.

As further shown in FIG. 7, process 700 may include performing one or more actions associated with one or more application-specific microservices of the MaaS client platform using the reusable microservice (block 760). For example, the microservice platform (e.g., using processor 420, memory 430, storage component 440, input component 450, output component 460, communication interface 470 and/or the like) may perform one or more actions associated with one or more application-specific microservices of the MaaS client platform using the reusable microservice, as described above.

Process 700 may include additional implementations, such as any single implementation or any combination of implementations described below and/or in connection with one or more other processes described elsewhere herein.

In a first implementation, the microservice type is a transaction microservice type, the reusable microservice is a reusable transaction microservice, and performing the one or more actions comprises tracking, using the reusable transaction microservice, a sequence of steps in a transaction; determining, based on using the reusable transaction microservice to track the sequence of steps, that the transaction failed; and causing, using the reusable transaction microservice, the transaction to be reversed based on determining that the transaction failed. In a second implementation, alone or in combination with the first implementation, the microservice type is an orchestration microservice type, the reusable microservice is a reusable orchestration microservice, and performing the one or more actions comprises detecting, using the reusable orchestration microservice, an event associated with a first application-specific microservice of the one or more application-specific microservices; and causing using the reusable orchestration microservice, a second application-specific microservice of the one or more application-specific microservices to perform one or more other actions based on the event.

In a third implementation, alone or in combination with one or more of the first and second implementations, detecting the event comprises determining, using the reusable orchestration microservice and based on a machine learning model, an estimated health of the first application-specific microservice; and detect the event is basing on the health of the first application-specific microservice. In a fourth implementation, alone or in combination with one or more of the first through third implementations, the microservice type is a choreography microservice type, the reusable microservice is a reusable choreography microservice, and performing the one or more actions comprises receiving, using the reusable choreography microservice, an indication of one or more local transactions associated with a first application-specific microservice of the one or more application-specific microservices; detecting, using the reusable choreography microservice and based on the one or more local transactions, an event associated with the first application-specific microservice; and causing, using the reusable choreography microservice, a plurality of second application-specific microservice of the one or more application-specific microservices to perform one or more other actions based on the event.

In a fifth implementation, alone or in combination with one or more of the first through fourth implementations, detecting the event comprises determining, using the reusable choreography microservice and based on a machine learning model, an estimated health of the first application-specific microservice based on the one or more local events; and detecting the event is basing on the estimated health of the first application-specific microservice.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a microservice platform, a request to configure a microservice associated with a particular software application for use by a microservices as a service (MaaS) client platform for performing one or more actions associated with a plurality of application-specific microservices;
  determining, by the microservice platform and based on a microservice type of the microservice, one or more parameters that are to be provided by a reusable microservice for the microservice;
  processing, by the microservice platform, the request using a natural language processing machine learning model to determine one or more values for the one or more parameters;
  configuring, by the microservice platform and using a microservice template, Hall the reusable microservice to satisfy the request to configure the microservice,
    wherein the reusable microservice is hosted by the microservice platform, and
    wherein the reusable microservice is configured based on:
      the microservice type,
      the one or more parameters, and
      the one or more values; and
  communicating, by the microservice platform and using the reusable microservice, with one or more backend services to perform the one or more actions associated with the plurality of application-specific microservices.

2. The method of claim 1, wherein the microservice type comprises:
  an event microservice type,
  an authorization microservice type,
  an authentication microservice type,
  an audit microservice type,
  a notification microservice type,
  a transaction microservice type,
  an orchestration microservice type, or
  a choreography microservice type.

3. The method of claim 1, wherein the microservice type is an authentication microservice type;
  wherein the reusable microservice is a reusable authentication microservice; and
  wherein the one or more parameters comprise at least one of:
    one or more authentication types to be supported by the reusable authentication microservice,
    one or more authentication backend services to be supported by the reusable authentication microservice,
    one or more authentication credential types to be supported by the reusable authentication microservice, or
    one or more types of authentication tokens to be generated by the reusable authentication microservice.

4. The method of claim 1, wherein the microservice type is an authentication microservice type;
  wherein the reusable microservice is a reusable authentication microservice; and
  wherein communicating with the one or more backend services to perform the one or more actions comprises:
    receiving, using the reusable authentication microservice, an authentication request from an application-specific microservice of the plurality of application-specific microservices;
    identifying, using the reusable authentication microservice, authentication credentials in the authentication request;
    transmitting, using the reusable authentication microservice, the authentication credentials to an authentication backend service; and
    receiving, using the reusable authentication microservice and based on transmitting the authentication credentials, an authentication token from the authentication backend service.

5. The method of claim 1, wherein the microservice type is an authorization microservice type;
  wherein the reusable microservice is a reusable authorization microservice; and
  wherein the one or more parameters comprise at least one of:
    one or more authorization types that are to be performed by the reusable authorization microservice,
    which of the one or more backend services the reusable authorization microservice is to access to determine authorization of a user, or
    one or more user parameters to include in authorization tokens to be generated by the reusable authorization microservice.

6. The method of claim 1, wherein the microservice type is an authorization microservice type;
  wherein the reusable microservice is a reusable authorization microservice; and
  wherein communicating with the one or more backend services to perform the one or more actions comprises:

receiving, using the reusable authorization microservice, an authorization request from an application-specific microservice of the plurality of application-specific microservices,
    wherein the authorization request is associated with a user;
identifying, using the reusable authorization microservice, an authentication token in the authorization request,
    wherein the authentication token is associated with the user;
searching, using the reusable authorization microservice, an authorization database backend service to identify one or more authorization parameters for the user;
generating, for the user and using the reusable authorization microservice, an authorization token that includes information identifying the one or more authorization parameters; and
transmitting, using the reusable authorization microservice, the authorization token to the application-specific microservice.

7. The method of claim 1, further comprising:
identifying the microservice template based on the microservice type.

8. A microservice platform, comprising:
one or more memories; and
one or more processors, communicatively coupled to the one or more memories, to:
    receive a request to add a microservice associated with a particular software application to a microservices as a service (MaaS) client platform for performing one or more actions associated with a plurality of application-specific microservices;
    process the request using a natural language processing machine learning model to determine a microservice type for the microservice;
    determine, based on the microservice type:
        one or more parameters that are to be provided by a reusable microservice for the microservice, and
        a microservice template;
    process the request using the natural language processing machine learning model to determine one or more values for the one or more parameters;
    configure the reusable microservice to satisfy the request to configure the microservice,
        wherein the reusable microservice is hosted by the microservice platform, and
        wherein the reusable microservice is configured based on:
            the microservice type,
            the microservice template,
            the one or more parameters, and
            the one or more values; and
    perform the one or more actions associated with the plurality of application-specific microservices using the reusable microservice.

9. The microservice platform of claim 8, wherein the microservice type is an audit microservice;
    wherein the reusable microservice is a reusable audit microservice; and
    wherein the one or more parameters comprise at least one of:
        one or more audit information types that are to be stored by the reusable audit microservice,
        one or more event types that the reusable audit microservice is to log, or
        one or more event types for which the reusable audit microservice is to provide notifications.

10. The microservice platform of claim 8, wherein the microservice type is an audit microservice type;
    wherein the reusable microservice is a reusable audit microservice; and
    wherein the one or more processors, when performing the one or more actions, are to:
        receive, using the reusable audit microservice, requests from an application-specific microservice of the plurality of application-specific microservices to provide an auditing service for the application-specific microservice;
        receive, using the reusable audit microservice and based on receiving the request, audit information associated with application-specific microservice; and
        at least one of:
            store the audit information in a data store,
            identify one or more audit events based on the audit information, or
            transmit one or more notifications based on the one or more audit events.

11. The microservice platform of claim 10, wherein the one or more processors, when identifying the one or more audit events based on the audit information, are to:
    perform, using the reusable audit microservice, a predictive analysis on the audit information to identify the one or more audit events,
        wherein the predictive analysis is performed using an Elasticsearch, Logstash, and Kibana stack.

12. The microservice platform of claim 8, wherein the microservice type is a notification microservice type;
    wherein the reusable microservice is a reusable notification microservice; and
    wherein the one or more parameters comprise at least one of:
        one or more event types for which the reusable notification microservice is to provide notifications, or
        one or more notification types that the reusable notification microservice is to provide.

13. The microservice platform of claim 8, wherein the microservice type is a notification microservice type;
    wherein the reusable microservice is a reusable notification microservice; and
    wherein the one or more processors, when performing the one or more actions, are to:
        receive, using the reusable notification microservice, an indication of an event associated with an application-specific microservice of the plurality of application-specific microservices; and
        provide, using the reusable notification microservice, one or more types of notifications associated with the event.

14. The microservice platform of claim 13, wherein the one or more processors, when receiving the indication of the event, are to:
    receive the indication of the event from a message broker service.

15. A non-transitory computer-readable medium storing instructions, the instructions comprising:
    one or more instructions that, when executed by one or more processors of a microservice platform, cause the one or more processors to:
        receive a request to add a microservice associated with a particular software application to a microservices as a service (MaaS) client platform for performing one or more actions associated with a plurality of application-specific microservices;
process the request using a natural language processing machine learning model to determine a microservice type for the microservice;
determine, based on the microservice type:
one or more parameters for the microservice that are to be provided by a reusable microservice, and
a microservice template;
determine one or more values for the one or more parameters;
configure Hall the reusable microservice to satisfy the request to configure the microservice,
wherein the reusable microservice is configured based on:
the microservice type,
the microservice template,
the one or more parameters, and
the one or more values; and
perform the one or more actions associated with the plurality of application-specific microservices using the reusable microservice.

16. The non-transitory computer-readable medium of claim 15, wherein the microservice type is a transaction microservice type;
wherein the reusable microservice is a reusable transaction microservice; and
wherein the one or more instructions, that cause the one or more processors to perform the one or more actions, cause the one or more processors to:
track, using the reusable transaction microservice, a sequence of steps in a transaction;
determine, based on using the reusable transaction microservice to track the sequence of steps, that the transaction failed; and
cause, using the reusable transaction microservice, the transaction to be reversed based on determining that the transaction failed.

17. The non-transitory computer-readable medium of claim 15, wherein the microservice type is an orchestration microservice type;
wherein the reusable microservice is a reusable orchestration microservice; and
wherein the one or more instructions, that cause the one or more processors to perform the one or more actions, cause the one or more processors to:
detect, using the reusable orchestration microservice, an event associated with a first application-specific microservice of the plurality of application-specific microservices; and
cause, using the reusable orchestration microservice, a second application-specific microservice of the plurality of application-specific microservices to perform one or more other actions based on the event.

18. The non-transitory computer-readable medium of claim 17, wherein the one or more instructions, that cause the one or more processors to detect the event, cause the one or more processors to:
determine, using the reusable orchestration microservice and based on a machine learning model, an estimated health of the first application-specific microservice; and
detect the event based on the estimated health of the first application-specific microservice.

19. The non-transitory computer-readable medium of claim 15, wherein the microservice type is a choreography microservice type;
wherein the reusable microservice is a reusable choreography microservice; and
wherein the one or more instructions, that cause the one or more processors to perform the one or more actions, cause the one or more processors to:
receive, using the reusable choreography microservice, an indication of one or more local transactions associated with a first application-specific microservice of the plurality of application-specific microservices;
detect, using the reusable choreography microservice and based on the one or more local transactions, an event associated with the first application-specific microservice; and
cause, using the reusable choreography microservice, second application-specific microservice of the plurality of application-specific microservices to perform one or more other actions based on the event.

20. The non-transitory computer-readable medium of claim 19, wherein the one or more instructions, that cause the one or more processors to detect the event, cause the one or more processors to:
determine, using the reusable choreography microservice and based on a machine learning model, an estimated health of the first application-specific microservice based on the one or more local transactions; and
detect the event based on the estimated health of the first application-specific microservice.

* * * * *

UNITED STATES PATENT AND TRADEMARK OFFICE
CERTIFICATE OF CORRECTION

PATENT NO. : 10,992,780 B1
APPLICATION NO. : 16/732848
DATED : April 27, 2021
INVENTOR(S) : Shivakumar Rudrappa Goniwada et al.

It is certified that error appears in the above-identified patent and that said Letters Patent is hereby corrected as shown below:

In the Claims

In Claim 1, Column 25, Line 52, "microservice template, Hall the reusable microservice" should be changed to -- microservice template, the reusable microservice --.

In Claim 15, Column 29, Line 12, "configure Hall the reusable microservice to satisfy the" should be changed to -- configure the reusable microservice to satisfy the --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*